(12) United States Patent
Suenaga et al.

(10) Patent No.: US 8,580,462 B2
(45) Date of Patent: Nov. 12, 2013

(54) ELECTRODE CATALYST MATERIAL COMPRISING CARBON NANO-FIBERS HAVING CATALYST PARTICLES ON THE SURFACE AND IN THE INSIDES OF THE INTERIOR AREA AND A FUEL CELL HAVING THE ELECTRODE CATALYST MATERIAL

(75) Inventors: Seiichi Suenaga, Kanagawa-ken (JP); Maki Yonetsu, Tokyo (JP); Norihiro Tomimatsu, Tokyo (JP); Hideyuki Oozu, Kanagawa-ken (JP); Yasuhiro Goto, Tokyo (JP); Yoshihiko Nakano, Kanagawa-ken (JP); Shinichi Onodera, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1211 days.

(21) Appl. No.: 12/400,542

(22) Filed: Mar. 9, 2009

(65) Prior Publication Data

US 2009/0169951 A1 Jul. 2, 2009

Related U.S. Application Data

(62) Division of application No. 10/882,361, filed on Jul. 2, 2004, now Pat. No. 7,838,165.

(51) Int. Cl.
*H01M 4/02* (2006.01)
(52) U.S. Cl.
USPC .............................. 429/532; 429/523; 429/524

(58) Field of Classification Search
CPC ................ H01M 4/925–4/926; H01M 4/9075; H01M 4/9083
USPC ................... 429/523, 524, 532; 502/180, 185
See application file for complete search history.

(56) References Cited

U.S. PATENT DOCUMENTS

| 4,770,867 | A | 9/1988 | Coulon et al. |
| 6,099,960 | A * | 8/2000 | Tennent et al. ............... 428/367 |
| 6,849,245 | B2 | 2/2005 | Baker et al. |
| 2002/0177032 | A1* | 11/2002 | Suenaga et al. ................. 429/44 |
| 2005/0112450 | A1* | 5/2005 | Wang et al. ..................... 429/44 |

FOREIGN PATENT DOCUMENTS

| JP | 61-500561 | 3/1986 |
| JP | 62-500943 | 4/1987 |
| JP | 2000-281303 | 10/2000 |
| WO | WO 86/03455 | 6/1986 |

* cited by examiner

*Primary Examiner* — Zachary Best
(74) *Attorney, Agent, or Firm* — Oblon, Spivak, McClelland, Maier & Neustadt, L.L.P.

(57) ABSTRACT

The carbon fibers of this invention is characterized in that irreducible inorganic material particles in a mean primary particle size below 500 nm and reducible inorganic material particles in a mean primary particle size below 500 nm were mixed by pulverizing and then, the mixture was heat treated under the reducing atmosphere and metal particles in a mean particle size below 1 μm were obtained, and the mixed powder of the thus obtained metal particles with the irreducible inorganic material particles are included in the carbon fibers.

15 Claims, 4 Drawing Sheets

ELECTRODE CATALYST MATERIAL COMPRISING CARBON NANO-FIBERS HAVING CATALYST PARTICLES ON THE SURFACE AND IN THE INSIDES OF THE INTERIOR AREA AND A FUEL CELL HAVING THE ELECTRODE CATALYST MATERIAL

TECHNICAL FIELD

The present invention relates to manufacturing a method of carbon fiber synthesizing catalysts and carbon fibers using this carbon fiber synthesizing catalyst, and a manufacturing method of fuel cell catalytic material using the carbon fiber synthesizing catalyst.

PRIOR TECHNOLOGY

In recent years, fuel cell is largely attracting public attentions as an electric power generating technology with less emission of carbon dioxide and less environmental burden.

In the electrode of conventional fuel-cell, a film electrode complex that is an fuel-cell stack composed in a laminated layer structure comprising cathode current collector/cathode electrode (airpole)/protonelectrolyte that is ion conductive material/anode electrolyte (fuel pole)/anode current corrector. In this fuel-cell, fuel gas such as hydrogen gas supplied to the anode electrode side is decomposed and ionized by a catalyst contained in the electrode and then, is moved to the cathode electrode side via proton electrolyte as hydrogen ion, combines with oxygen in the air supplied to the cathode electrode and generates water. Electric power is generated when hydrogen ion is moving from the anode electrode to the cathode electrode in this reaction and current can be taken out from the cathode current collector and the anode current collector.

In this electrode reaction, it is an extremely important element to reduce diffusion and resistance of proton and electron for improving efficiency of electrodes; that is, the entire fuel-cell efficiency.

Generally as an electrode structure, an electrode laminated on a current collecting plate by carrying micro particles of transition metal that is a catalyst for fuel cell on carbon of conductive material is adopted. Particulate carbon is often used as this catalyst carrier but there is such a problem that resistance is large when carbon particles are mechanically contacted and a large electrode efficiency cannot be obtained. At the same time, there was also a problem that as the spatial configuration was not sufficient, diffusion of gas was insufficient. Further, there was such a problem that there were catalyst particles for fuel cell between carbon particles contacting portion and less participate in reaction with fuel and fuel was partly wasted.

In order to solve these problems, it is now considered effective to change carbons from particulate type to fiber type.

Technologies, etc. to use fiber type carbon as catalyst carrier were so far reported by E. Theodoridou (Electrochimica. Acta., vol. 38, No. 6 P. 793 (1993) and Guangli Chen (Nature vol. 393, P 346 (1998)).

It is the present state, however, that in any report so far published, a technology to manufacture an electrode comprising carbon fiber carrying micro catalyst particles uniformly and high thickly has not yet been developed.

By the way, as represented by carbon nano-tube, graphite nano-fiber, carbon fiber so far known are those that are small in a diameter blow 100 nm, 100~1000 nm like VGCF, more than 1 µm like active carbon fiber.

When using as a catalyst carrier, carbon fiber capable of carrying fine-catalysts high thickly and maintaining a proper space between carriers was demanded so far.

However, active carbon fiber having a large specific surface area is in a diameter as large as more than several µm and is bulky and therefore, it is difficult to apply as a carrier. Further, VGCF carbon is a proper size in a diameter of several hundred nm, but is small in specific surface area 100 $m^2/g$ and is not adequate to a catalyst carrier. Further, carbon nano-tube attracting attention as a new material may have a specific surface area in some one but is as very fine as several nm~several 10 nm, and fills up a space and not desirable.

As a material in size slightly larger than carbon nano-tube, graphite nano-tube is available. However, a specific surface of this material is also slightly small below 150 $m^2/g$ (One of reference literatures, R. T. K. Baker J. Phys. Chem B. 105, 115-118 (2001) and furthermore, a diameter is below 100 nm.

Such the form of the graphite nano-tube depends largely on the form of its synthetic catalyst. It is considered that according to a conventional method, a fine catalyst raw manufactured according to the coprecipitation method, etc. is used as a starting material and catalyst particle size immediately before the synthesizing is as large as 1 µm by particle growth, and is broken into parts during the synthesizing and micro carbon is produced) Reference Literature: For example, Journal of Catalysis 131, 60-73 (1991) by R. T. Baker).

As described above, there was no carbon fiber satisfying both of specific surface area and size and insufficient catalyst carrier was used so far.

When manufacturing fuel sells, etc., cells having sufficient output could not be manufactured.

In order to solve the problems explained above, it is demanded to provide carbon fiber that is ideal for catalyst carrier and realize a fuel cell that has high catalytic performance and high output.

SUMMARY OF THE INVENTION

The carbon fiber synthetic catalyst of the present invention is characterized in that irreducible inorganic material particles of which mean particle size of primary particles is below 500 nm and reducible inorganic material particles of which mean particle size of primary particles is below 500 nm were mixed while pulverizing and this mixture was heat treated under the reduction atmosphere and the reducible inorganic material particles were reduced and mixed powder of thus obtained metallic particles of which mean particle size is below 1 µm with irreducible inorganic material particles was included.

Composite carbon materials involved in the present invention are characterized in that at least more than two kinds of carbon fibers synthesized at different temperature conditions under the presence of a carbon fiber synthetic catalyst are included.

The manufacturing method of fuel cell catalyst materials involved in the present invention is characterized in that it is composed of a step of; synthesizing carbon fiber by thermally decomposing hydrocarbons under the presence of carbon fiber synthetic catalyst involved in the present invention and a step of obtaining carbon fiber carrying catalyst particles on the surface and in the inside by having the carbon fiber to carry catalyst particles according to the colloidal method.

The carbon fiber manufacturing method of the present invention is characterized in that it comprises the steps of mixing irreducible inorganic material particles of which particle size of primary particles is below 500 nm and reducible inorganic material particles of which mean particle size of primary particle is below 500 nm while pulverizing them;

By reducing the reducible inorganic material particles by heat treating the obtained mixture in the reducing atmospheric furnace, obtaining the mixed powder of metallic particles of which mean particle size is below 1 μm and the irreducible inorganic material particles as carbon fiber synthetic catalysts; and Synthesizing carbon fibers by introducing hydrocarbon containing gas into the furnace and thermally decomposing the hydrocarbon under the presence of the carbon fiber synthetic catalyst.

The first fuel cell catalytic material of the present invention is characteristic in that it contains carbon fiber of which mean diameter is within the range of 100~1000 nm and the specific surface area according to the BET method is within the range of 200~500 $m^2/g$, and Catalytic particles carried on the carbon fibers and containing the first metallic element comprising at least either one of Pt and Ru and the second metallic element of 30 weight % (an element other than the first metallic element).

The second fuel cell catalytic material of the present invention is characterized in that in fuel cell catalytic material containing carbon nano-fiber and catalytic particles carried on the carbon nano-fiber, Abundance ratio of the carbon nano-fiber carried on the surface and in the inside of the catalytic particle is more than 10%.

DESCRIPTION OF EMBODIMENTS

Figure 1:
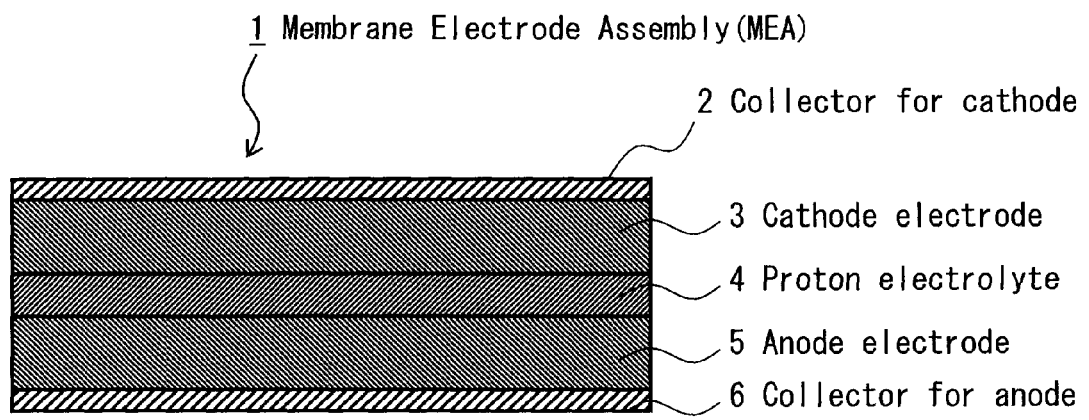
FIG. 1 is a schematic diagram showing the outline of one embodiment of a membrane electrode assembly that is used in a fuel cell of the present invention.

First Embodiment (Catalyst Material for First Fuel Cell)

Catalyst material for the first fuel cell of the present invention is characterized in that it includes carbon fibers in a mean diameter in the range of 100~1000 nm and a specific surface area according to BET method in the range of 200~500 $m^2/g$ and Catalyst particles containing the first metallic element (catalyst metallic element for fuel cell) comprising at least one of Pt and Ru and the second metallic element (elements other than the first metallic element) of less than 30 weight %.

According to such catalyst materials, it is possible to secure an electronic conduction path by thoroughly contacting carbon fibers each other and increase catalyst carrying amount. As the result, the output characteristic of fuel cells equipped with an anode electrode containing such catalyst material or a cathode electrode containing catalyst material can be improved.

The reason for why mean diameter of carbon fiber is limited to a range of 100 nm will be explained. When a mean diameter is 100 nm or less, the electronic conduction path among carbon fibers becomes short. On the other hand, when a mean diameter is above 1000 nm, the catalyst carrying amount becomes less. A further preferred range of mean diameter is 200~500 nm.

Further, when the specific surface area of carbon fiber according to BET method is limited to the range of 200~500 $m^2/g$, a sufficient catalyst carrying amount can be secured.

Further, when amount of the second metallic element in catalyst particles is limited to below 30 weight %, the manufacturing process of catalyst material can be simplified. The further preferred range of amount of the second metallic element in catalyst particles is below 20 weight %.

The second metallic element is preferred to have a function as a carbon fiber synthetic catalyst. As the second metallic element, from the viewpoint to secure the output characteristic of fuel cell, it is preferred to contain at least one kind of metallic element that is selected from a group comprising Cu, Ni, Fe and Co.

The first catalyst material involved in this invention is obtained by synthesizing through the thermal decomposition of hydrocarbon under the presence of the first carbon fiber synthetic catalyst and by having the obtained carbon fiber to carry catalyst particles.

(Catalyst for First Carbon Fiber Synthesizing and its Adjusting Method)

Catalyst for the first carbon fiber synthesizing and its adjusting method will be explained below.

The catalyst for the first carbon fiber synthesizing of the present invention is characterized in that after mixing irreducible inorganic material particles of which mean particle size of primary particles of primary particles is below 500 nm and reducible inorganic material particles of which mean particle size of primary particle is below 500 nm by grinding and this mixture is reduced by applying the heat treatment under the reducing atmosphere, and thus obtained mixed powder of metallic particles in mean particle size below 1 μm and the irreducible inorganic material particles is included.

Irreducible inorganic materials in this invention are those materials which are not reduced to metallic elements by the heat treatment under the reducible atmosphere of hydrogen, vacuum, etc. out of such materials as metallic oxides, nitrides, carbides, acid-nitrides, etc. Among these materials, oxides are preferred and, for example, aluminum oxide (alumina), magnesium oxide (magnesia), silicon dioxide can be pointed up.

Further, reducible inorganic materials are those materials that are reduced to metallic elements through the heat treatment in the reducible atmosphere of hydrogen, vacuum, etc. out of metallic oxides, nitrides, carbides, acid-nitrides, etc. Among these materials, at least one kind of material selected from iron oxide, nitride and carbide, cobalt oxide, nitride and carbide, nickel oxide, nitride and carbide is preferred. In particular, oxides are preferable. Definitely, it is desirable to use materials containing at least one kind of first oxide selected from a group comprising iron oxide, cobalt oxide and nickel oxide and at least one kind of second oxide selected from a group comprising copper oxide, tin oxide, ruthenium oxide and zinc oxide. Out of these materials, a combination of the first oxides and copper oxide as the second oxide is preferred.

As a mechanical mixing method to mix irreducible inorganic material particles and reducible inorganic material while grinding, not restricted but a ball mill method may be pointed up.

In the mixture containing reducible inorganic material and irreducible inorganic material, a ratio of irreducible inorganic material is desirable in a range of 1~20 volume %. An adding amount of irreducible inorganic material is an amount for carbon fiber synthetic catalyst. For example, in the case of reducible inorganic material comprising copper oxide powder and nickel oxide powder, an adding amount of irreducible inorganic material to a Cu—Ni alloy produced after reduction of the reducible inorganic material.

The reduction processing temperature is not particularly limited in a range for reducible to a metallic state. However, it is preferred to perform the process at a temperature below 750° C. because at a temperature higher than this temperature, the growth of reduced metallic particles become too big.

Further, it is better to perform the reduction process in the temperature rising process up to a carbon fiber synthesizing temperature. In this case, when the temperature rising speed is too fast, the reduction becomes insufficient.

Further, to obtain alloy particles of more than two element systems by reducing more than two kinds of reducible inorganic materials, it is necessary to select heat treatment conditions so that the alloying after reduction is thoroughly carried out. In the case of alloy catalyst described above, it is also better to execute the reduction and alloying successively in the temperature rising process.

As the above-mentioned temperature rising condition, the speed range of 1~10° C./min. is preferred and further, a range of 3~8° C./min. is preferred.

The reason for why a mean particle size of metallic particles is defined at less than 1 μm will be explained below. When s mean particle size is defined at more than 1 μm, the segmentation of carbon fiber synthetic catalyst particles tends to be accelerated and carbon fibers small in mean diameter and short in mean length are obtained. As a result, electron conductivity among carbon fibers becomes insufficient and a network construction by carbon fibers becomes insufficient and in the extreme case, it may become difficult to manufacture electrodes. A further preferable range of a mean particle size is below 0.5 μm. A mean particle size referred to here denotes a mean particle size obtained with no distinction of primary particles and secondary particles.

Further, metallic particles with a mean particle size of primary particles below 100 nm and that of secondary particles below 500 nm are more preferable.

A mean particle size of metallic particles generated through the reduction of reducible inorganic material particle is desirable to be larger than a mean particle size of the irreducible inorganic material particles. This is because the probability for distribution of irreducible inorganic material among reducible inorganic material particles becomes high.

(Adjusting Method of Catalyst for First Carbon Fiber)

The adjusting method of catalysts for the first carbon fiber synthesizing involved in the present invention will be explained below.

As catalysts (herein after abbreviated as CNF synthetic catalyst) when synthesizing carbon fiber (for example, carbon nano-fiber), at least, one kind of metal selected from a group comprising Ni, Fe and Co, at least, one kind of metal selected from a group comprising Ni, Fe and Co, an alloy containing at least one kind of metal selected from a group comprising Cu, Ag and Mn, etc. can be pointed up.

Regarding these metallic components, detailed descriptions are available in, for example, a literature (J. Mater, Res., vol. 8, No. 12 (1993) 3233). The inventor of the present invention found that in a method using oxide particles as catalyst raw, an alloy containing nickel and copper at a rate of 1:1 is especially able to manufacture excellent carbon nano-fiber from the point of length and specific surface area.

Hereinafter, taking a case to use CNF synthesized catalyst comprising Ni and Cu as an example, the manufacturing of the alloy will be explained.

First, neutralize salts such as nickel nitrate, copper nitrate, etc. in the wet processing using alkali such as ammonia, and synthesize nickel oxide powder and copper oxide powder are synthesized. Weigh nickel oxide powder and copper oxide powder so that they become the aimed CNF synthesized catalyst composition after reduction. After weighing, add alumina powder of which mean particle size of primary particle is below 500 nm (more preferably, below 100 nm) to the two kinds of powder.

Mix three kind powder of weighed nickel oxide, copper oxide and alumina in a ball mill, etc. Mix them until powders are smashed to primary particles below 100 nm and powders are uniformly mixed. In this processing, raw of catalyst powder for growth of carbon nano-fiber is manufactured.

Then, put the mixture of oxide powders that is catalyst raw materials manufactured in the preceding processing in a pan that is made of alumina or silicon oxide, etc. and by bringing the pan into an electric furnace, raise a temperature after the atmospheric substitution with hydrogen gas, reduce copper oxide that is reducible at a low temperature and then reduce other powders in order of nickel oxide powder that is reduced at a higher temperature. The reduction is made in the temperature rising process up to the carbon nano-fiber growth temperature under the pure hydrogen atmosphere. At this time, it is preferred to limit the temperature rising speed in a range of 1~10° C./min. This is because the reduction/alloying of catalyst is taken place sufficiently under this condition. Further, under this condition, the reduction/alloying of catalyst is progressed gradually and dispersibility of alumina (irreducible inorganic material powder) becomes good.

The first purpose to add alumina powder in the above process is to suppress the particle growth of CNF synthetic catalyst. Part of this alumina powder present among CNF synthetic catalyst suppresses the particle growth of CNF synthetic catalyst and CNF synthetic catalyst in an optimum particle size can be synthesized. That is, particle size of primary particles of CNF synthetic catalyst can be suppressed to around 100 nm and also, particle size of secondary particles formed by collected primary particles can be suppressed to 1000 nm or below.

The adding quantity of this alumina powder is proper at 1~2 volume %. This is because en effect of suppressing particle growth may become less when an adding amount of alumina powder is below 1% and when more than 20%, an adding amount becomes excessive and conductivity as an electrode may drop. In particular, when no alumina powder was added, merged particle growth is generated in the CNF synthetic catalyst manufacturing process and a mean particle size of Cu—Ni alloy particles may possibly exceed 1 μm. When a mean particle size of Cu—Ni alloy particles becomes more than 1 μm, it becomes difficult to obtain carbon nano-fiber having a specific surface area and length that are optimum for carrying catalytic particles. A further preferable range of adding amount is 1~10 volume %.

Further, even when an adding amount of alumina powder is reduced, it is possible to get close a preferable carbon nano-fiber configuration when the carbon nano-fiber synthesizing condition is made reasonable. In this case, it is better to synthesize carbon nano-fiber according to synthesizing conditions at high temperature side, low ethylene density side and short time side. Definitely, it is better to set a temperature at 700° C. or above, ethylene density at 10 volume % or below and a synthesizing time within 1 hour.

A mean primary particle size of alumina particles that are used in this embodiment is preferred within a range of 10~500 nm. This is because a particle growth suppressing effect is higher at micro-particle size. However, when too fine, it may become difficult to disperse particles uniformly. A more preferable range is 10~100 nm and a further preferred range is 10~50 nm.

A mean primary article size of oxide particles comprising the above-mentioned catalytic raw material is preferred to be in a range of 10~500 nm. This is for the reason explained below. When a mean primary particle of oxide particles is above 500 nm, the catalytic particle size becomes too large. During the growth of carbon nano-fiber from such large particles as these particles, the catalytic raw particles segmentation is taken place and as a result, much carbon nano-fibers in short mean diameter below 100 nm are produced and not suited for the electrode formation. On the other hand, when a mean primary particle of oxide particles is made below 10 nm, the particle growth suppression effect becomes less and aggregation/particle growth may be caused. A more preferable range of a mean primary particle of oxide particles is 10~100 nm and a further preferable range is 30~100 nm.

(First Fuel Cell Catalyst Carrier Synthesizing Method)

Next, a synthesizing method of fuel cell catalyst carrier using the first carbon fiber synthesizing catalyst involved in the present invention will be explained.

A fuel cell catalyst carrier that is synthesized in this invention is a mixed material of carbon fiber having micro-pores developed on the surface (for example, carbon nano-fiber) and irreducible inorganic material particles that are component substances of the first carbon fiber synthesizing catalyst.

A mean diameter of the micro-pores on the surface carbon nano-fiber is preferred in a range of 1~10 nm. This is because catalytic metals can be efficiently carried on the surface when a mean micro pores is in this size.

Further, as carbon nano-fiber that forms such the surface, carbon nano-fiber composed of crystals in a mean size 10~50 nm is especially preferred because a network among crystals is suited for carrying fine catalysts.

Such carbon nano-fibers are formed when carbon nano-fibers are synthesized at a higher temperature above 600° C.

For the fuel cell catalyst carrier synthesizing means, a well known method can be adopted but a heat CVD method is a most preferable method as it is a simple and cheap process.

The carbon nano-fiber synthesizing according to this heat CVD method is made as shown below.

That is, in succession to the above-mentioned CNF synthesized catalyst manufacturing process, using the same furnace, heat the furnace temperature up to a carbon nano-fiber growing temperature by supplying hydrogen gas.

When the furnace temperature is raised to the carbon nano-fiber growing temperature, supply gas comprising mainly hydrocarbon gas to exchange atmospheric gas. Then while heating, decompose hydrocarbon gas on CNF synthesizing catalyst (fir example, a mixture of Ni—Cu alloy powder and alumina powder) and separate carbon nano-fiber.

In this process, a mixture of carbon nano-fiber and alumina powder is manufactured.

In this process, a mix gas of such gas as ethylene, methane or acetylene gas and such inert gas as hydrogen, helium, argon, nitride, etc. is preferred for the atmospheric gas. Mixed gas in a range of, for example, ethylene: hydrogen=1:5~1:100 is pointed out. By supplying these gas at a flow rate 10 mL~10 L/min., synthesizing is carried out. Further, in this invention, a proper range of carbon nano-fiber growing temperature is 500~1000° C.

Carbon nano-fiber manufactured in this process is in diameter 10~100 nm, aspect ratio is more than 10, specific surface area is 300~350 $m^2/g$ and micro-pores are present on the surface. A mean diameter of the micro-pores is 1~10 nm and this micro-pore portion becomes the site to carry fuel cell catalyst efficiently in the subsequent process.

Further, the carbon nano-fiber in the above embodiment contains hydrogen atoms at more than 0.1 atomic %. These hydrogen atoms are effective for carrying fuel cell catalysts.

Further, it is preferred that synthesized carbon nano-fibers are of a so-called Platelet type or Herringbone type that the C surface of graphite comprising carbon nano-fiber is oriented to the longitudinal direction at an angle above 45° C. or below 90° C. This is because the carbon nano-fibers are able to carry fuel cell catalyst particles on the side surfaces of the fibers minutely and high thickly.

The graphite crystals comprising carbon fibers are in the hexagonal crystal structure and the bonding force in the C-surface is strong and the bonding force in the C-axis direction is weak. Therefore, in the case of the above Platelet type or Herringbone type carbon nano-fibers, the C-surface end is located at the fiber side surface and irregularity tends to develop and micro-pores are easily formed. Further, at the same time, the C-surface end has a strong adsorbing force to other materials and it is possible to adsorb materials that have high affinity for catalyst or catalyst raw material effectively. The present invention further utilizes such the effect.

Carbon nano-fiber type that is generated differs depending on synthesizing conditions. That is, when the growing speed is slow, Platelet type is separated and when the growing speed is fast, Herringbone type is separated. For example, when an Ni series growing catalyst is used and the CVD is conducted using pure Ni catalyst at 500~600° C. low temperature side, Platelet type is liable to grow and when the CVD is conducted using Ni—Cu alloy catalyst at high temperature side of above 700° C., Herringbone type is liable to grow.

In this invention, more than two kinds of carbon nano-fibers manufactured according to a method of a different synthesizing temperature may be used as catalyst carriers. For example, a mixture having more than two kinds of diameters comprising carbon nano-fibers in small diameters 10~100 nm and carbon nano-fiber in large diameters 100~1000 nm can be used as catalyst carriers.

When carbon nano-fibers in wide distribution diameters 10~1000 nm are used, the excessive aggregation of carbon nano-fibers can be suppressed.

(Catalyst Particle Carrying Method to Catalyst Carrier)

Next, a method to carry catalyst particles to synthesized catalyst carriers will be explained.

It is desirable to use transition metal particles as fuel cell catalyst particles. A mean diameter of these transition metal particles is desirable to be below 10 nm. This is because transition metal particles function efficiently as catalysts in his size.

As transition metal particles, for example, metals or alloys selected from a group comprising Pt, Pd, Ni, Au, Ru, Rh, Ir Os, Pd, Mo, Mn, W, Ta and Sn are pointed out. In the case of PEM, DMFC, etc., transition metal particles comprising noble metals such as Pt or Pt—Ru alloy, etc. are pointed out.

It is preferred that these transition metal particles are dispersed uniformly on the surfaces of carbon nano-fibers and carried in the range of 20~50 weight % to carbon nano-fibers.

Carrying catalyst will be explained below taking Pt as an example.

First, putting fuel cell catalyst carrier of this invention described above (for example, a mixture of carbon nano-fiber and alumina powder) in pure water, disperse fibers using supersonic ray. At this time, excessive aggregation of carbon nano-fibers can be suppressed by alumina powder dispersed in carbon nano-fibers. This is the second effect of addition of alumina powder in this invention.

Then, boil the mixture while stirring and then, after adding such salts as chloroplatinic acid. Etc., further heat. Then, after making this mixture alkalescent by adding such alkalis as sodium hydrogen carbonate, ammonia, etc. continuously heat the mixture. Thereafter, filtrate and boil the mixture by putting in pure water and clean it until ion component is removed. Thereafter, filtrate the mixture and recover carbon nano-fiber from the solution and after dried, reduce it in the reduction atmosphere containing hydrogen. Carbon nano-fibers with Pt particles carried on the surface is thus obtained.

In the above step, the reduction condition is preferred to be in a range of 100~500° C. If this reduction temperature is too low, Pt cannot be reduced thoroughly and if too high, Pt particles cause united particle growth and is not desirable.

Further, in this fuel cell catalyst carrying process, it is possible to solve CNF synthesized catalyst in acid solution of chloroplatinic acid and separate by mixing with catalyst metal such as Pt, etc. in the process to neutralize alkalis simultaneously. When the solution in the mixed state is reduced in hydrogen under the reducing condition, it is possible to alloy CNF synthesized catalyst make an alloy with Pt. When CNF synthesized catalyst metals such as Ni, Fe, Co, etc. are alloyed with Pt and other noble metals, efficiency of catalyst can be improved. In this invention, it is also possible to effectively utilize CNF synthesized catalyst by alloyed with fuel cell catalyst metals.

It is desirable that catalyst particles carried on carbon nano-fibers in which such irreducible inorganic material as alumina is dispersed to contain catalyst metal element for carbon fiber synthesizing comprising at least one kind of metal element selected from a group of fuel cell catalyst metal element, Cu and Ni, Fe and Co. Pt, Pd, Ni, Au, Ru, Rh, Ir, Os, Pd, Mo, Mn, W, Ta, Sn can be pointed out as fuel cell catalyst metal elements. Further, it is desirable to restrict abundance ratio of carbon fiber synthesizing catalyst metal elements in a range of 0.1~30 weight % when the entire catalyst particle is at 100 weight %. This is for reasons shown below. When abundance ratio is set at 0.1 weight % or below, an effect to promote activity of fuel cell catalyst cannot be expected. On the other hand, when total abundance ratio is above 50 weight %, abundance ratio of fuel cell catalyst metal element becomes short and catalyst activity may become low. The further preferable range of abundance ratio of carbon fiber synthesizing contact metal element in catalyst particles is 1~10 weight %.

In the above process, carbon nano-fiber with fuel cell catalyst particles and alumina powder carried can be synthesized as catalyst material for fuel cell. In this embodiment, absorptivity of Pt to the carbon nano fiber surfaces is high and catalyst particles can be carried at high density in particle size below 5 nm.

(Fuel Cell Electrodes)

Next, electrodes for fuel cells including the catalyst materials for fuel cells described above will be explained.

Fuel cell electrodes involved in this invention includes catalyst material for fuel cell and ion conductive materials of this invention. For ion conductive material, proton conductive material is preferred.

For example, ion-exchange resin such as perfluorosulfonic acid polymer is used for proton conductive material. As this material, Nafion (Registered Trademark) that is on sale from DuPont is well known.

Further, in the case of fuel cell electrodes using composite materials for fuel cell electrodes, a material structure composed of carbon nano-fiber with catalysts carried on the surface and impregnated with proton conductive material can be pointed out. Proton conductive material is preferred to exist in the state covering the surface of the structure.

Preferred thickness of electrodes is 10~500 μm and especially when used for the cathode, the open porosity is desirable at 30~80%.

Fuel electrodes are manufactured using porous materials according to a method including the process to form carbon nano-fibers carrying fuel cell catalysts and alumina powder in a thin film.

In this process, porous materials in such shapes as plate, cloth, felt, paper shapes made of carbon, tin oxides, titanium oxide, fluoric resin plastic, etc. are usable.

Definitely, for example, Japan Carbon made cloth GF-8-P in thickness less than 1 mm, Tore made carbon paper TGP-H-030, TGP-H-090 or fluorocarbon resin paper (Brand Name: Teflon Paper), etc. can be pointed out.

In his invention, when carbon nano-fiber, alumina powder and ion conductive material are formed on a conductive support medium as fuel cell electrodes, the porous material can be used directly as a conductive support medium. In this case, when cloth shape or felt shape carbon porous material is used, it becomes possible to finally manufacture electrodes having deformed capability.

Weighing a mixture of carbon nano-fiber and alumina powder on which reduced fuel cell catalyst manufactured in the preceding process are carried, disperse the mixture in pure water and deposit the mixture on porous material such as carbon paper, etc. At this time, the sucking/filtering method is desirable as a time for deposition is reduced and sedimentary layers become minute.

Amount of the mixture of carbon nano-fibers and alumina powder carrying fuel cell catalysts is preferred in a range 1 mg~10 mg/l $cm^2$ of porous material such as carbon paper, etc. It is desirable that the above-mentioned amount is derived from amount of catalysts per unit area.

Further, it is preferred that carbon nano-fibers longer than 1 μm are included at least more than 50% because carbon nano-fibers longer than 1 μm are needed to form a network in the in-plane direction. When fibers are longer than this length, no in-plane network is formed but crack is caused and the electrode layer mainly comprised of carbon nano-fibers cannot be formed. Further, it is more preferable that carbon nano-fibers longer than 10 μm are contained by more than 50%.

When manufacturing membranes principally made of carbon nano-fibers without conductive support medium, so-called self-supporting membranes, carbon paper that is used porous material is preferred to pre-cover material it becomes easy to exfoliate the carbon nano-fiber membrane from this porous material. Further, when a self-supporting membrane is manufacture, Teflon made porous paper is usable in addition to carbon paper.

After deposit the mixture of carbon nano-fiber and alumina, dry the mixture at a temperature of room temperature~about 100° C. Thus, a fuel cell electrode layer can be formed on carbon paper.

The electrode layer is desired to have porosity above a certain level in order to make air permeability of fuel gas, etc. good. Definitely, it is desirable that there are through-holes of open porosity 30~80%.

Further, it is preferred that carbon nano-fibers are properly dispersed as could as possible. This is because the surfaces can be effectively utilized and the performance of catalysts can be displayed to the extent possible. Therefore, oxides of alumina in 100 nm or below that are present together with carbon nano-fibers become effective. This is because the presence of this oxide powder makes the dispersibility of carbon nano-fibers good.

When a conductive porous material such as carbon paper, etc. is used directly as an electrode collector in the process up to now, it is dried in that form and is impregnated with ion conductive material. When a self-supporting membrane is manufactured, separate a mixed layer of carbon nano-fibers an alumina powder carrying fuel cell catalysts from conductive porous material.

Next, the process to separate the mixing layer of carbon nano-fiber and alumina powder carrying fuel cell catalysts from porous materials will be explained.

When porous paper such as Teflon paper, carbon paper, etc/recovered by materials that are solved in organic solvent are used directly, impregnate them with ion conductive material after dried in as-is state. When manufacturing a self-supporting membrane, peel off the mixed layer of carbon nano-fibers and alumina powder carrying fuel cell catalysts form a porous material.

Next, the process to peel off the mixed layer of carbon nano-fibers and alumina powder carrying fuel cell catalysts from a porous material will be explained.

Use porous paper such as Teflon paper, carbon paper, etc. covered by material that is solved in organic solvent. Dip porous paper having a mixed layer of carbon nano-fiber and alumina powder carrying dried fuel reforming catalyst in organic solvent such as ethanol. The covering material coated on porous material such as carbon paper is dissolved and a carbon nano-fiber membrane is separated. Place the separated carbon nano-fiber membrane on a water-repellent board such as Teflon paper, etc. and dry it.

Finally, the process to impregnate ion conductive material will be explained.

This process is common to the process wherein electrodes mainly consisting of carbon nano-fiber layer formed on a porous collector and the electrode layer were peeled off as the self-support membrane. The process will be explained below taking the self-support membrane as an example.

As ion conductive material, perfluorosulfonic acid polymer (manufactured by DuPont: Brand Name Nafion) is representatively used.

The self-support membrane that is principally composed of carbon nano-fiber (Brand Name: Nafion) is dipped in perfluorosulfonic acid solution for impregnation. For perfluorosulfonic acid polymer solution, it is preferred to use 1~10% organic solvent.

It is further better to use the vacuum-impregnation because micro-pores are developed on the fiber wall surface and Nafion can be impregnated effectively for a short time. The impregnation is not specifically restricted but when a solvent of low density is used, several times can be made. Further, at this time, a drying process can be inserted during the impregnation. Amount of impregnation is not specified particularly. However, weight of perfluorosulfonic acid polymer (Brand Name: Nafion) is preferred to be above 10% and below 70% and furthermore, above 20% and below 50% because when the weight i above levels, porosity drops and when below, a good conduction path cannot be taken.

Thus, it becomes possible to manufacture a fuel cell electrode layer and a fuel cell self-support electrode membrane comprising the above-mentioned electrode layer only, characterized in that a layer comprising carbon nano fiber in diameter 100 nm~1000 nm, alumina in diameter below 100 nm, fuel cell catalyst and ion conductive material is formed on a porous collecting board.

In particular, the self-support membrane can be deformed flexibly and using this membrane, a flexible MEA can be manufactured. Further, an electromotive member in cylindrical shape, etc. can be manufactured.

Regarding the self-support membrane manufacturing method, in addition to the above-mentioned method, a method to deposit carbon nano-fiber powder on a felt-shape carbon support member after dispersing carbon nano-fiber powder in a Nafion containing solution and impregnating Nafion in the powder state carbon nano-fiber is considered. After deposition, the carbon nano-fiber membrane only may be used by peeling off or may be used in one unit with flexible carbon felt. Further, Nafion is more effective when impregnated according to the vacuum impregnation.

In the embodiment of the present invention described above, an example using Ni—Cu alloy as CNF synthesized catalyst and Pt as fuel cell catalyst is shown. However, it is not essential for the present invention to use materials explained in the above-mentioned embodiment but other materials shown are also usable under almost same conditions and the present invention is not restricted to the embodiment shown above.

(First Fuel Cell Electrode)

The first fuel cell electrode is characterized in that it is provided with an electrode layer including carbon nano-fibers in a mean diameter 10~1000 nm, an aspect ratio more than 10, irreducible oxide powder in a diameter 100 nm or below, fuel cell catalyst and ion conductive material. This fuel cell electrode allows to further provide a collector on which the said electrode layer is formed.

The first fuel cell electrode manufacturing method of the present invention is characterized in that it is comprising of the steps of: forming a mixture of transit metallic particles and alumina powder by reducing a mixture of transit metallic oxide powder and irreducible oxide powder;

Synthesizing carbon nano fibers by heating a mixture of the generated transition metallic particles and irreducible oxide powder and bringing a gas comprising principally hydrocarbon to contact the mixture of the heated transition metallic particles and alumina powder; carrying fuel cell catalysts on the generated carbon nano-fibers; and Forming an membrane by impregnating an ion conductive material to a layer comprising the carbon nano-fiber and alumina powder carrying the fuel cell catalyst on the surface.

In the first fuel cell electrode manufacturing method of the present invention is characterized in that it is composed of a proton electrolytic layer, electrodes comprising carbon nano-fibers in mean diameter 10~100 nm, aspect ratio above 10, irreducible oxide powder in a diameter below 100 nm, fuel cell catalysts, a membrane including ion conductive material electrodes formed on both surfaces of the proton electrolytic layer, and collectors formed on both surfaces of this electrode.

(Carbon Nano-Fiber Synthesizing Method)

The carbon nano-fiber synthesizing method involved in the present invention is characterized in that gas that is principally composed of hydrocarbon gas is brought in contact with a mixture of transition metal oxide powder and irreducible oxide power in a mean particle size below 100 nm.

The first fuel cell electrode and the first fuel cell involved in the present invention can be manufactured using carbon fibers that are synthesized under the presence of the first carbon fiber synthesizing catalysts of the present invention. A carbon fiber synthesizing method, a catalyst carrying method, an electrode manufacturing method, etc. can be executed in the similar manner as explained for the first fuel cell catalytic material.

According to the first fuel cell electrode and its manufacturing method, the first fuel cell and its manufacturing method involved in this invention described above, and the carbon nano-fiber synthesizing method in this invention, it is possible to realize a fuel cell that is excellent in power generating efficiency.

Further, according to the first fuel cell manufacturing method involved in this invention, it is possible to manufacture carbon nano-fibers in large diameter, longer length and large specific surface area and as the result, it becomes possible to carry the fuel cell catalyst at a high density. Thus, it is enable to manufacture of highly efficient fuel cells.

In this invention, it is necessary to adopt carbon nano-fibers in a range of a mean diameter 100~1000 nm. When the diameter is above the range, it is not preferred as the specific surface area of carbon nano-fiber drops and an image carrying ability drops. On the other hand, the diameter is below the above-mentioned range, it is also not preferred as its mechanical strength is insufficient and its handling is adversely affected.

Further, the aspect ratio of carbon nano-fiber; that is, a ratio of length and diameter is desirable to be above 10. When this aspect ratio is below the above-mentioned range, fibers do not have sufficient flexibility and tend to entwine each other and it is not preferable as it becomes difficult to make a sheet having gas permeability.

The specific surface area of carbon nano fiber that is used in this invention is preferred to be 200 $m^2/g$.

This is because the fuel cell catalyst carrying ability drops when below the above-mentioned level and more than 300$^2$/g is further preferred because the catalyst carrying ability is further promoted at this level.

The C-face of graphite crystal comprising the carbon nano-fiber is desirable to have been oriented in the longitudinal direction at an angle of 45~90°.

The reason is that fine pores tend to develop along the edge of the C-surface of the side face of the fiber.

The carbon nano-fiber is desired to contain more than 0.5 atomic % of hydrogen element.

The reason is that when hydrogen atom is contained in carbon nano-fibers, adsorbed impurities become easily removable.

The irreducible oxides that are used in this invention are materials having lower reducibility than carbon nano-fiber synthesizing catalyst and for example, alumina and silicon oxide are pointed out.

The ion conductive materials that are used in this invention are cohesive materials and do not obstruct the movement of hydrogen ion and such ion exchange resin as perfluorosulfonic acid polymer is used. As this material, Nafion (Trade Name) that is on sale from Du Pont is known.

In this invention, it is preferred to use this ion conductive material in a range of 10~70 weight % to carbon nano-fiber. When the blending amount is above this range, the gas permeability of this electrode is lost and power generating capacity drops. On the other hand, when the blending amount of the ion conductive material is below the above-mentioned range, not only the possibility of drop of proton conductivity becomes high but also the mutual contact of carbon nano-fibers drops. As a result, there such defects that not only the inner resistance of this electrode increases and the power generating efficiency drop but also the mechanical strength of the electrode drops.

(Fuel Cell Catalysts)

As the fuel cell catalysts that are used in this invention, metals or alloys selected from Pt, Pd, Ni, Au, Ru, Rh, Ir, Os, Pd, Mo, Mn, W, Ta, Sn, etc. are pointed out. Among these metals or alloys, Pt or Pt alloys are preferable from the viewpoint of catalytic activity. This fuel cell catalysts are desired to have been uniformly distributed on the surface of carbon nano-fiber and its particle size is desirable in a range of 1~10 nm. When a mean particle size of this fuel cell catalyst is below the above-mentioned range, there is a problem that no sufficient catalytic function is obtained. On the other hand, when the mean particle size is above the range, there is a problem of drop of the specific surface area and both cases are not preferred.

An adding volume of this fuel cell catalyst to electrode is desired to be more than $1 \times 10^{16}$ piece/$m^2$ in the number density for carbon nano-fiber. Further, it is desirable to be $5 \times 10^{16} \sim 1 \times 10^{17}$ piece/$m^2$. When the volume of fuel cell catalyst drops to below the above-mentioned range, catalyst efficiency is lowered and the power generating efficiency becomes worse and is not desirable. On the other hand, the volume of fuel cell catalyst increases to above the above-mentioned range, the improvement of power generating efficiency corresponding to the increase in catalyst volume and uneconomical and not desirable.

The catalyst for fuel cell is desirable to be an alloy of the fuel cell catalytic component and carbon nano-fiber synthesized catalytic component.

This is because performance of catalyst can be improved as a result of alloying.

The open porosity of fuel cell electrode of this invention is desirable to be 30~80 volume %.

When the open porosity is below this range, fuel gas and air cannot be circulated effectively and not desirable. On the other hand, when the open porosity is above this range, the mechanical strength of fuel cell electrode drops and is not desirable.

Further, in this invention, the open porosity is measured according to a method shown below. That is, for known weights of existing members per unit space of electrode (carbon nano-fiber, fuel cell catalyst, oxide particles), amount of ion conductive material is accurately measured and the remaining space volumes are measured based on densities of respective members.

The thickness of fuel cell electrode membrane of this invention is preferred at 10~500 μm.

The reason is that when the thickness is above the range, portions far off from the electrolyte will increase and waste portions are produce. Further, when the thickness is below the above-mentioned range, sufficient catalytic amount cannot be provided.

FIG. 1 is a schematic diagram of the structure of electrode for fuel cell to which this invention is applicable, and the fuel cell electrode of this invention is related to a cathode electrode 3 and an anode electrode 5 in a membrane electrode assembly of the fuel cell shown in FIG. 1. Its construction and the manufacturing method will be described below in detail.

The fuel cell electrode of this invention is provided with a membranous assembly bonding carbon nano-fiber in a diameter 100~1000 nm, an aspect ratio above 10 with irreducible oxide powder in diameter below 100 nm by an ion conductive material, carrying fuel cell catalytic particles mainly composing of transition metal on the surface.

The fuel cell electrode in the embodiment of this invention has its own self-shape retention and does not require a supporting member especially. However, when used in an application requiring the mechanical strength, it is possible to make an electrode by laminating layers comprising carbon nano-fiber, irreducible oxide power and ion conductive material carrying fuel cell catalytic particles mainly composed of transition metal on a conductive support member such as carbon paper or carbon cloth.

Cloth-shape/plate shape carbon porous materials formed by carbon, tin oxides, titanium oxides, etc. are preferred and for example, Nippon Carbon made 1 mm thick cloth GF-8-P, Toray made carbon paper TGP-H-030, TGP-H-090 can be pointed out. When cloth shape or felt shape carbons are used as conductive support members, it becomes possible to prepare electrodes having deformed abilities finally. Further, it is possible to use this conductive support member also as collectors 2, 3 shown in FIG. 1.

As shown in FIG. 1, this fuel cell electrode is used by arranging on its both surfaces with a proton electrolyte 4 put between. At both sides of the electrode, collectors 2 and 6 which also serve as separators and a membrane electrode assembly (MEA) 1 is formed. Further, it is also possible to arrange conductive porous sheet gas dispersion layer between the collectors 2, 6 and electrodes 3, 5 for uniformly dispersing fuel gas and air. For this gas dispersion layer, carbon paper or carbon cloth is used.

(Second Fuel Cell Catalytic Materials)

Next, the second fuel cell catalytic material involved in this invention will be explained.

This second fuel cell catalytic materials are characterized in that an abundance ratio of the carbon nano-fiber with the catalytic particles are carried on its surface and in the inside is more than 10% in the fuel cell catalytic material including carbon nano-fibers and catalytic particles carried on the carbon nano-fibers.

In the case of carbon nano-fibers carrying catalytic particles on the surface and the inside, it is also possible to form three-phase surfaces comprising carbon, catalyst and proton conduction material in the inside of fiber. Therefore, when the abundance ratio of carbon nano-fiber carrying catalytic particles on the surface and inside is made to 10% or more, sufficient volume of three phase surface and catalyst utilizing ratio and exide utilizing ratio can be improved. A preferable range of abundance ration is above 30% and more preferable range is more than 50%.

Carbon nano-fibers are manufactured using, for example, metals such as nickel, iron, cobalt, metal oxides or alloys as catalysts and hydrocarbon as source gas through the heat CVD. After manufacturing carbon nano-fibers, it is desirable to remove catalysts by solving in acid but activity of fuel cell catalysts can be improved depending on kind of catalysts, it is desirable not to remove them in this case. Further, the fiber surfaces also can be modified after synthesized by processing them in the atmospheric gas. Further, the diameter of carbon nano-fiber can be controlled according to particle size of catalyst in manufacturing carbon nano-fiber. Definitely, diameters of carbon nano-fibers can be controlled by reducing metallic oxides that are catalytic raw material and adding irreducible metallic oxide particles that are particle growth inhibitors to the catalytic raw material to inhibit growth of catalytic particle in the process to synthesize carbon nano-fiber under the presence of obtained catalytic particles. As a particle growth inhibitor, for example, alumina fine particle, etc. can be pointed out.

In carbon fibers that are used for the reported carbon nano-tube and carbon paper, the carbon crystal face is in parallel with the longitudinal direction. On the contrary, the c-face (the edge surface) of the carbon crystal face of the carbon fiber manufacturing using catalyst processed by the reduction process by adding irreducible metallic oxide fine particle that is a particle growth inhibitor to catalytic raw material containing metallic oxides has an angle against the longitudinal direction of carbon fiber. The edge of this carbon fiber crystal face is able to finely carry catalytic metal fine particle such as platinum or platinum alloy. Catalytic fine particles are desired to have a high number density per unit surface area and therefore, fine particle size below 20 nm is preferred. Accordingly, the angle of carbon fiber edge 30~90° is preferable and a range of 45~90° is extremely preferred.

In order to manufacture carbon nano-fibers in the good catalytic particle carrying and good proton conductor existing state, carbon nano-fibers are required to be in the polycrystalline structure assembled with 10~50 nm crystalline particles and nano-order concavo-convex existing on the surface; that is, for manufacturing an ideal three-phase surface. When explaining the structure in detail, catalysts are present as carried on the polycrystalline particle surface and entering into the concave-convex surface and particle boundary pores. Therefore, it was looked as if carrying catalysts entered into the insides of fibers when observed through the cross-section. Further, proton conductors also entered into the inside of fibers to cover the surfaces of polycrystalline particles. As the proton conductor entered into the inside of fibers, adhesion to the carried catalyst surface and fiber surface can be made extremely high.

Further, in order to carry catalytic particles on the carbon fibers in the more high density, the specific surface area of fibers (measure according to the BET method) is desirable 200 m$^2$/g or above. When catalytic particles are carried at the high density, an electrode can be manufactured in a more thin layer and is better for improvement of gas diffusion, reduction of material cost and downsizing.

A mean diameter of carbon nano-fibers is desirable within a range of 100~1000 nm. When the fiber mean diameter is below 100 nm, the fiber length is short, the shape as an electrode layer in combination of a network with fibers cannot be maintained and electrodes may be cracked. When the fiber mean diameter is above 1000 nm, the specific surface area drops, platinum carrying volume on the fibers drops, pore diameters become large and therefore, spaces cannot be used effectively. Further, it is more better when more than 50% of fibers longer than 1 μm are contained. It is further better to classify carbon fibers after synthesized for adjusting their diameters and lengths.

In addition, the porosity of the electro catalyst layer is desirable to be more than 30%. If it is below 30%, it becomes difficult to diffuse gas and the output may possibly drop.

For fuel direct modifying catalyst to be carried on this fiber, for example, alloyed particles of more than one element selected from platinum particle, elements of platinum group, the fourth and the fifth period transition metals with platinum can be pointed out. As elements of platinum group, Ru, Rh, Ir, Os, Pd are pointed out. For definite examples, there are Pt, Pt—Ru, Pt—Ru—Ir, Pt—Ru—Ir—Os, Pt—Ir, Pt—Mo, Pt—Fe, Pt—Co, Pt—Ni, Pt—W, Pt—Sn, etc.

(Carry Catalyst Preparing Method)

Next, a method for preparing carry catalyst will be described.

Suspend carbon nano-fiber in water and heat and after adding salt that is catalytic raw material, add alkali to make the water alkaline and continuously heat. Thereafter, filtrate the water and clean sediments. Further, put the sediments in a flask, add pure water, heat for a while and filtrate. Repeat this process for several times and thereafter, dry the sediments in a drying machine. Put the dried sediments in an atmospheric furnace and heat them by supplying reduction atmosphere, for example, inert gas containing hydrogen. The furnace temperature at this time is preferred in a range of 100~900° C. and in particular, a range of 200~500° C. is better. At below 100° C., crystallization of catalyst is insufficient and activity is low and catalyst particles tend to grow secularly when used for electrodes. At above 900° C., the particle growth of catalytic particles becomes prominent and the catalytic activity drops extremely. Carrying volume is better in a range of 3~80 weight % against carriers. At below 3 weight %, no cell performance is produced and at 80 eight %, catalysts cannot be carried on the carrier surface and catalysts aggregate and catalyst utilizing efficiency drops.

(Fuel Cell Electrode Layer Manufacturing Method)

Next, the fuel cell electrode layer manufacturing method involved in this invention will be explained.

This fuel cell electrode layer manufacturing method is a fuel cell electrode layer manufacturing method comprising a step of process to reduce pressure of proton conductive material and impregnate in the structure formed with carbon nano-fibers and electrode layers of proton conductive material not impregnated electrode layer including catalytic particles carried on the carbon nano-fibers and is characterized in that a rate of the carbon nano-fiber carried on the surface and the inside of the carbon nano-fibers is more than 10%.

When electrolyte is diluted in organic solvent and impregnated in the electrode layer without proton conductive material including catalytic material impregnated under the reduced pressure, proton conductive material can be permeated to the insides of the carbon nano-fibers and therefore, the three-phase field surface formed by carrier carbon, catalysts and proton conductive material can be ideally constructed. As a result, the rate of catalyst utilization as well as the rate of oxidant utilization can be improved drastically, a highly efficient and low cost can be achieved and as catalyst material movement when operating a fuel cell is hardly taken place, an electrode excellent in stability for an extended period can be provided.

It is possible to further include conductive material in an electrode layer containing catalytic material and proton conductive material in order to improve the conduction.

For proton conductive material, any material can be used provided that it is able to provide proton. Definite examples are as shown below but not restricted thereto. For example, fluorocarbon resin having sulfonic acid group (Nafion, Flemion, Aciplex, etc.), inorganic material such as tungustic acid/phosphotungustic acid are pointed out.

Weight of proton conductive material is 1~200 weight portion against 100 weight portion of catalytic material (catalyst carrying fiber) and 10~120 weight portion is especially preferred. At 1 weight portion, proton conductive material becomes short, resistance increases, and cell efficiency drops. Further, in the case of carbon fiber used in this study, electric resistance increases at 200 weight portion and in addition, pores are filled by proton conductive material and as a result, fuel diffusion drop and cell efficiency drops.

As a method to impregnate proton conductive material, dilute proton conductive material in organic solvent or water, immerse a electrode layer and impregnate proton under the reduced pressure. Density of the solvent containing diluted proton conductive material should be 5 weight % or below. If more than 5 weight %, solvent viscosity becomes high, air bubbles in the electrode layer hardly come out during the impregnation process and it becomes difficult to form an ideal three-phase field surface. Further, when density is below 1 weight %, proton conductive material remaining in the electrode layer is possibly not sufficient and therefore, it is better to perform the impregnation operation repetitively. Further, at that time the heat processing may be made. When performing the impregnation operation, after lifting up the electrode layer from the solution containing proton conductive material and may be dried on a material having solvent absorbing force such as a filter paper or a sponge. This is effective for removing excess proton conductive material in an electrode supporter (carbon paper, etc.).

As conductive carrier materials, definite examples are shown below but not restricted to these materials.

For example, carbon, conductive metallic oxides, inorganic materials coated with conductive materials (particles, fibers and tubes are included in all of these materials).

Conductive additives can be any materials if conductive and in any shapes if satisfy conditions specified in Claims such as particle, fiber, tube, etc. and not restricted.

There are several methods for manufacturing electrodes having these electrode component matters. Two kinds of methods out of them will be described. First, disperse catalyst carrying fibers that are mixed so as to satisfy conditions in water through a dispersion machine. Then, according to a method of filtration under reduced pressure or a paper making method, form fibers in dispersion solution in a membrane shape electrode on a conductive porous material having a collector function and dry it. Then, dip it in a solution with proton conductive material dissolved or suspended, impregnate under the reduced pressure and pull up and dry it. Catalyst carrying fiber may be reduced in the form of fiber when proton conductive material is impregnated in it or after it is formed on a porous material, it may be processed for reduction jointly with a porous material.

Next, another method is called as a wet process method to manufacture a slurry. In this method, slurry components manufactured by dispersing the above-mentioned components in water or organic solvent or a solution comprising these mixture are coated on conductive porous matters (collector) according to various methods and dried. Solvent volume of slurry components at that time is adjusted so that solids content becomes 5~60%. At below 5%, electron induction in the electrode drops to the lower cell performance and at above 60%, viscosity of slurry is too high and it is difficult to form a membrane and in addition, when the electrode is dried, cracks and peeling are presented remarkably.

Using the electrode manufactured according to the method described above, a membrane electrode assembly (MEA) was manufactured by putting a proton conductive solid membrane between an anode electrode and a cathode electrode, and thermal compression bonding with a roll or a press. Definitely, for the anode electrode catalyst, Pt—Ru group that has a strong resistance against methanol and carbon monoxide and for the cathode electrode, an electrode manufactured using Pt was used. The conditions for the thermal compression bonding at this time are temperature 70~180° C., pressure 10~200 $kg/cm^2$ and time for 1~30 min. When a pressure and a temperature were low and a time was short, the compression bonding is insufficient and a resistance as an electrode is high and the cell performance becomes worse. Under such conditions as high pressure, high temperature and long time, the solid membrane and the electrode layer may be deformed or decomposed and fuel and oxidizing reagent may not be supplied properly and the membrane may be broken and cell characteristics also can be lowered.

(Fuel Cell Catalyst Sheet)
Next, the fuel cell catalyst sheet involved in this invention will be explained.

This fuel cell catalytic sheet is characterized in that it is provided with a sheet structured by carbon nano-fiber, catalytic particles carried on the surface of the carbon nano-fiber, and proton conductive material adhered on the surfaces of the carbon nano-fiber so as to contact the catalytic particles, The specific surface area according to the carbon nano-fiber BET method is more than 200 m²/g, a mean fiber diameter μ is 100~500 nm, a variation σ in the distribution of the mean fiber diameter μ is expressed by the numerical expressions (1) and (2) shown below:

$$\sigma \leq \frac{1}{1.28}(\mu - 80) \quad (100 \leq \mu \leq 335) \quad \text{Numerical Expression (1)}$$

$$\sigma \leq \frac{1}{2.58}(850 - \mu) \quad (335 \leq \mu \leq 500) \quad \text{Numerical Expression (2)}$$

(Fuel Cell Self-Support Electrode Layer Manufacturing Method)

In addition, the fuel cell self-support electrode layer manufacturing method involved in this invention will be explained.

This manufacturing method is characterized in that it is composed of the steps of: obtaining catalyst carry carbon nano-fibers by carrying catalytic particles on carbon nano-fibers;

Suspending the catalytic carry carbon nano-fibers in water;

Forming a catalytic carbon nano-fiber layer by depositing the slurry on a porous support medium;

Separating the catalytic carry carbon nano-fiber layer from the porous support medium; and Dipping the catalytic carry carbon nano-fiber layer in a solution or solution containing water diluted proton conductive material to adhere the proton conductive material on the catalytic carry carbon nano-fiber; wherein the specific surface area according to the carbon nano-fiber BET method is more than 200²/g, the mean fiber diameter μ is 100~500 nm, and a variance σ of the distribution of the mean fiber diameter μ is expressed by the numerical expressions (1) and (2) shown below.

$$\sigma \leq \frac{1}{1.28}(\mu - 80) \quad (100 \leq \mu \leq 335) \quad \text{Numerical Expression (1)}$$

$$\sigma \leq \frac{1}{2.58}(850 - \mu) \quad (335 \leq \mu \leq 500) \quad \text{Numerical Expression (2)}$$

Fibrous electron conductor using the catalytic sheet of this invention and electrode and fuel cell using the fibrous electron conductor will be explained below in detail.

(Catalysts for Fuel Cell)

First, catalysts for fuel cell will be explained.

There are two kinds of catalysts for fuel cell; when it is carried on an electron conductor and not carried on an electron conductor. When not carried on an electron conductor, catalyst is not coated directly on an electron collector, amount of catalyst cannot be reduced and catalytic particle diameter is larger than that carried on a collector and activity per weight is low. On the other hand, when used on a carrier, fine catalytic particle in several nm can be carried on the surface of a carrier and catalyst of high activity per catalyst using weight can be obtained.

Here, taking carbon as electron conductor as an example, catalyst carried on this carbon will be explained in detail. If it is possible to realize the similar structure and conductivity, material for electron conductor is not restricted to carbon. For example, such oxide semiconductors as titanium oxide, tin oxide and zinc oxide, insulator ceramics with conductive material coated on the surfaces are also usable as electron conductors.

The inventor and others detected that it is possible to manufacture an independent catalytic layer by devising a fiber manufacturing method using carbon nano-fiber as catalytic carrier and that the cell performance of fuel cell using such the catalytic layer as an anode electrode or a cathode electrode can be improved remarkably.

Carbon nano-fiber can be manufactured using metals such as nickel, iron and cobalt, metal oxides or mixtures or alloys of these materials as catalyst and hydrocarbon as source gas according to the thermal CVD. After manufactured, it is desirable to remove catalyst as could as possible by solving using acid but may be not removed. Further, when carbon nano-finer is processed in the atmospheric gas after synthesized, it is also possible to the fiber surface can be reformed. Further, by changing diameters of catalytic particles when manufacturing carbon fibers, fiber diameters can be controlled. In addition, by controlling fiber diameters, irreducible metal oxide particles that are particle growth inhibitor can be added to raw material powder. As particle growth inhibitor, for example, fine alumina particles are usable.

The crystal plane of carbon used in reported carbon nano-tube, carbon paper, etc. is in parallel with the long direction of tubes. On the contrary, in the carbon nano-fibers manufactured according to the technique described above, the c-face (end face) of the crystal plane of carbon has an angle to the long direction of fiber. The end face of the crystal plane of this carbon nano-finer was detected as being able to carry fine catalytic metal particles of platinum or platinum alloy uniformly and finely. Fine catalytic particles are desired to have high number density per unit surface area and therefore, are desirable in fine particle diameter below 20 nm. Therefore, the edge angle of carbon nano-finer is preferred at 30~90° and furthermore, a range of 5~90° is highly preferred.

Further, in order to carry catalytic particles on the surface of carbon fiber at a high density, the specific surface area of the fiber (measured according to the BET method) is required to be more than 200 m²/g. Carbon fiber of specific surface area less than 200 m²/g has a low catalyst carrying ability, carry catalytic particle in large size cannot be carried and catalytic activity is lowered. Therefore, the cell performance is also lowered. When fibers having the specific surface area larger than 200 m²/g are used, catalytic particles can be carried at a high density and electrodes using a more thin layer can be manufactured and the gas diffusion can be improved, material cost can be reduced and downsizing can be realized.

A mean diameter of the carbon nano-fibers manufactured as described above is in a range of 1~1000 nm. For manufacturing self-support electrodes using carbon nano-fibers, it is demanded to select and use carbon nano-fibers having a diameters in specific range from these carbon fibers. Mean fiber diameter of carbon nano-fibers of his invention will be explained below in detail.

When mean fiber diameters of carbon nano-fibers were measured, it was experimentally confirmed that they are distributed in a lot of values that can be approximated in the normal distribution. When the distribution of fiber diameters is assumed to be the normal distribution, a mean fiber diameter μ and a value σ showing the variance of the distribution of the means fiber μ can be expressed using the numeral expressions (3) and (4) shown below.

$$\sigma = \sqrt{\frac{1}{N}\sum_{n=1}^{n}(\mu-\mu_n)^2} \qquad \text{Numerical Expression (4)}$$

$$\sigma = \sqrt{\frac{1}{N}\sum_{n=1}^{n}(\mu-\mu_n)^2} \qquad \text{Numerical Expression (4)}$$

Actually measured values can be obtained by measuring fiber diameters experimentally and from its distribution and a mean diameter. It was detected that it is possible to manufacture a self-support electrode layer when fibers in the range wherein the relation of μ and σ is expressed by the following numerical expressions (1) and (2).

$$\sigma \leq \frac{1}{1.28}(\mu-80) \quad (100 \leq \mu \leq 335) \qquad \text{Numerical Expression (1)}$$

$$\sigma \leq \frac{1}{2.58}(850-\mu) \quad (335 \leq \mu \leq 500) \qquad \text{Numerical Expression (2)}$$

The numerical expressions shown above can be led as shown below.

When the normal distribution of mean fiber diameters μ is shown, the relation expressed by the following numerical expression (5) is formed between μ and σ.

$$f(x) = \frac{1}{\sqrt{2\pi}\sigma}\exp\left(-\frac{(x-\mu)^2}{2\sigma^2}\right) \qquad \text{Numerical Expression (5)}$$

At this time, Z is expressed by the following numerical expression (6).

$$\frac{x-\mu}{\sigma} = z \qquad \text{Numerical Expression (6)}$$

Further, computed as shown below.

$$dxf(x) = \sigma dzf(z) \qquad \text{Numerical Expression (7)}$$

$$\int_X^\infty dxf(x) =$$

$$\int_{\frac{X-\mu}{\sigma}}^\infty \sigma dzf(z) = \frac{1}{\sqrt{2\pi}}\int_{\frac{X-\mu}{\sigma}}^\infty dze^{-\frac{z^2}{2}}$$

It was experimentally confirmed that the fiber diameter distribution of fibers in diameter below 80 nm less than 10% and fibers in diameter above 850 nm less than 5% is needed for manufacturing self-support membrane of high cell performance. When there are more than 10% of fibers below 80 nm, the shape of electrode cannot be maintained in the process to manufacture self-support membranes and cracks are produced on the electrode surface. On the other hand, when there are more than %5 of fibers above 850 nm, the specific surface area of fibers drops, catalyst carrying amount decreases and pore diameters become large. Accordingly, membranes become disadvantage in catalytic activity and cell performance drops. Thus, the numerical expression (8) shown below is led.

$$\int_{-\infty}^X dxf(x) = \int_{-\infty}^\infty dxf(x) - \int_X^\infty dxf(x) \qquad \text{Numerical Expression (8)}$$

$$1 - \frac{1}{\sqrt{2\pi}}\int_{\frac{X-\mu}{\sigma}}^\infty dze^{-\frac{z^2}{2}} \leq 0.1$$

When a solution is computed from the numerical expression (8), the following numerical expression (9) is obtained.

$$\sigma \leq \frac{1}{1.28}(\mu-80) \qquad \text{Numerical Expression (9)}$$

Further, the following numerical expression (10) is obtained.

$$\frac{1}{2\pi}\int_{\frac{X'-\mu}{\sigma}}^\infty dze^{-\frac{z^2}{2}} \leq 0.05 \qquad \text{Numerical Expression (10)}$$

$$\sigma \leq \frac{1}{1.28}(\mu-80)$$

Figure 7:
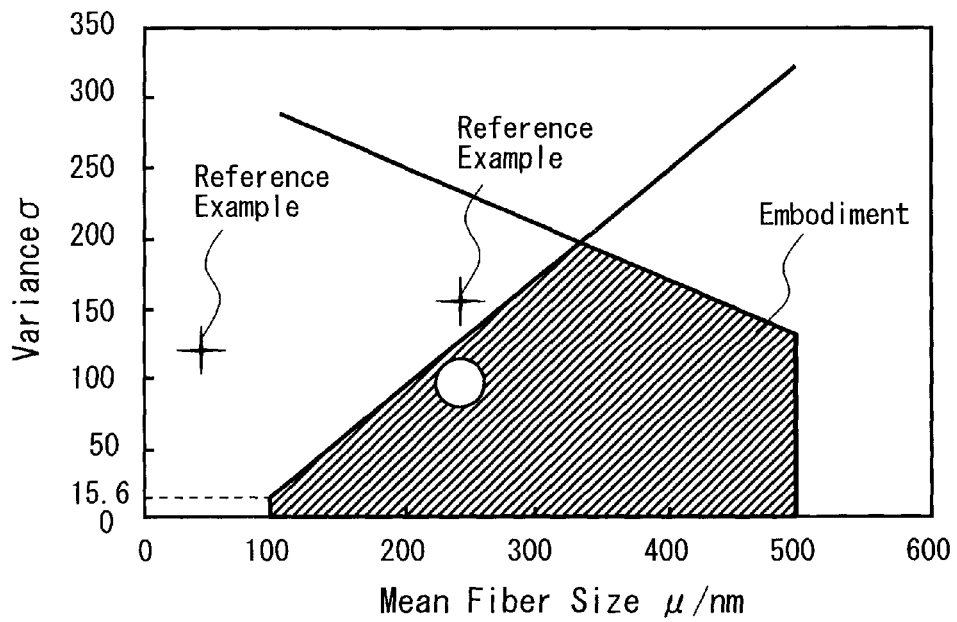
FIG. 7 is a characteristic diagram showing the relationship between a mean fiber diameter μm of carbon nano-fiber and fluctuation σ from the mean fiber diameter μ.

A graph shown in FIG. 7 can be drawn based on the above-mentioned numerical expressions (9) and (10). Fibers having a mean fiber diameter μ in the hatched range of and variance σ in distribution are used in this invention.

Further, a mean fiber diameter μ of the fiber must be 100~500 nm. When fibers are in a mean fiber diameter below 100 nm, the fiber length is short and fibers are combined to form a network and a shape as the electrode layer cannot be maintained. On the electrodes thus manufactured, a crack is produced. On the other hand, when a mean fiber diameter is above 500 nm, the specific surface area of the fiber drops and a platinum carrying amount on fibers drops. As a result, pore diameters become large and it is disabled to utilize the space efficiently.

Further, when fibers longer than 1 μm are contained more than 50%, it is further preferable. In this case, the network strength of fibers increases, cracks are hardly caused and the electrode layer strength is improved. To adjust the diameters and length of fibers as described above, it is preferred to classify fibers after synthesized.

As catalysts for fuel direct modification that are carried on fibers, platinum particles or alloy particles of platinum with more than one kind of elements selected from platinum group element and the fourth period and fifth period transition metals are pointed out. Platinum group elements are Ru, Rh, Ir, Os and Pd. Definite examples are shown below but not restricted to these elements. For example, Pt, Pt—Ru, Pt—Ru—Ir, Pt—Ru—Ir—Os, Pt—Ir, Pt—Mo, Pt—Fe, Pt—Co, Pt—Ni. Pt—W and Pt—Sn.

Carrying catalysts can be manufactured by carrying catalytic particles on carbon nano-fibers according to the technique shown below.

Suspend the carbon nano-fibers already explained in water, heat and add salts that are raw material of catalyst as described above. Thereafter, add alkali to make the solution weak alkaline and continuously heat. Then, filter the solution and wash sediments. Further, put sediments in a flask, add and heat for a while and filter. After repeating this operation several times, dry the sediments in a drying machine. Put the dried sediments atmospheric, for example, while supplying inert gas containing hydrogen. The furnace temperature at this time is preferred in a range of 100~900° C. or more preferably a range of 200~500° C. At below 100° C., crystallization of catalysts is insufficient and activity is low, and when used for electrodes, growth of catalytic particles tends to cause secularly. On the other hand, at above 900° C., the particle growth becomes remarkable and catalytic activity drops extremely.

It is preferred that catalyst carrying amount is in a range of catalytic weight 3~80 weight % against carbon nano-fibers as catalytic carrier. At below 3 weight %, it becomes difficult to get the sufficient cell efficiency. On the other hand, at above 80 weight %, it becomes difficult to carry catalyst on the carrier surface and catalysts cohere themselves and the catalytic utilizing efficiency may drop.

(Electrode Composition)

Catalyst carrying fibers obtained according to the technique described above can be used as an electrode composition. This electrode composition will be explained below.

Electrode composition includes catalyst carrying fiber and proton conductive material, and in order to promote electric conductivity, other conductive materials may be added. At this time, any conductive materials capable of transmitting proton are usable as a proton conductive material. Definitely, for example, fluorinated resins containing sulfonic acid group (Nafion, Flemion, Aciplex, etc.) and inorganic substances such as tungsten acid and phosphotungstic acid are pointed out.

Addition amount of proton conductive material is preferred at 1~400 weight % against catalyst carrying carbon nano-fiber 100 weight portion and 10~200 weight portion is more preferred. At below 1 weight portion, proton conductive material is short and resistance increase and cell performance drops. On the other hand, when adding amount of proton conductive material exceeds 400 weight portion, electronic resistance increases and pores are filled with proton conductive materials. Therefore, the diffusion of fuel also drops and the cell performance is lowered.

As actual examples of conductive carrier materials, carbon, conductive metal oxide and inorganic materials with conductive materials coated thereon (including particles, fibers and tubes) are pointed out but not restricted to these materials.

Any materials having conductivity are usable as conductive additives. Shapes of these additives are not especially restricted to particles, fibers and tubes.

There are several methods to manufacture electrodes using these electrode composition. Two kinds of them will be described. First, disperse catalyst carrying carbon nano-fiber mixed to conform manufacturing conditions in water with a dispersion machine. Then, form a membranous electrode on a carrier comprising porous matter from fibers in the dispersion solution by a sucking and filtering or according to a paper making method and dry it. Then, separate the dried electrode form a carrier by dipping in a solution. Further, prepare a solution with proton conductive material dissolved or suspended and catalyst carry carbon nano-fiber, and after the vacuum impregnation, pull up and dry it. Catalyst carry fiber may be reduced in the form of fiber or formed on a porous carrier and reduced together with the porous matter.

Or a method to manufacture slurry that is called as a wet method also can be adopted. In this case, first prepare a slurry composition by dispersing the above-mentioned electrode composition in water or organic solvent of their mixture. After coating the slurry composition thus obtained on a film using various techniques, dry and manufacture an electrode. An amount of solvent in the slurry composition is preferred to be so adjusted that the solid content is above 5% and below 60%. At below 5%, the coated film is easily stripped off. On the other hand, at above 60%, the viscosity of slurry becomes too high and it becomes difficult to forma membrane on a film. The membrane formed on this film is transferred on a proton conductive membrane and an electrode layer is thus obtained.

The porosity of such the electrode layer is desirable at more than 30%. When it is below 30%, gas is hardly dispersed and the output may drop.

(Membrane Electrode Assembly)

It is possible to manufacture an membrane electrode assembly (MEA) using an electrode manufactures according to the above-mentioned method. In this case, with a proton conductive solid membrane put between an anode electrode and a cathode electrode, thermally compress them by a roll or a press. An MEA is thus obtained. Definitely, catalyst for anode electrode is manufactured using Pt—Ru series strongly resistive against methanol and carbon monoxide for anode electrode catalysts and Pt for cathode electrode catalysts. Preferred thermal compressing conditions at this time are temperatures 70~180° C., pressures 10~200 kg/cm$^2$, and compressing times 1~30 min. When pressure and temperature are low or a compressing time is short, compression is insufficient and resistance as a electrode portion is high. Therefore, fuel cell performance drops. On the other hand, at the conditions of high pressure, high temperature or a long compressing time, solid membranes and electrode layers may be deformed or decomposed and fuel and oxidizing agent are not supplied satisfactorily. Further, an electrode layer, etc. may be destructed and fuel cell performance also drops.

When the above-mentioned cell was manufactured using particulate carbons are used as catalytic carriers, the electrode layer is cracked when slurry was coated on porous matter or film and dried and cannot be transferred. Only when slurry is coated thinly on films, the transfer is possible but as the catalytic layer is thin, amount of catalyst becomes short. Furthermore, when the shape as a flexible MEA is processed, cracks are generated on the catalytic layer. When carbon nano-fiber is used as a carrier as in this invention, the above-mentioned crack is not produced and it is possible to manufacture a flexible MEA.

As explained above, carbon nano-fiber having a mean fiber diameter in a specific range is used as catalytic carrier carbon, in this invention it is enabled to manufacture self-support flexible electrode layers in this invention, which was so far not possible to achieve when using particulate carbon was used. When a self-support carbon fiber electrode layer is applied to a fuel cell, it is possible to improve fuel/gas dispersion of the electrode layer. Further, because there is no collector or the shape and repellency is not restricted, it is advantageous in supplying fuel and gas and high output us expected. Furthermore, because a membrane/electrode composite becomes flexible, it becomes possible to manufacture fuel cells in various shapes.

(Second Fuel Cell Electrode)

A second fuel cell electrode of this invention is characterized in that it is composed of a porous catalyst carrier comprising conductive fibers having two particle size distributions of a first particle size distribution peak existing at the small particle size side and a second particle size distribution peak existing at the large particle size side, a catalyst carried on the conductive fiber belonging to the first particle size distribution peak and proton conductive material adhered to the surface of the conductive fiber so as to contact the catalyst.

It is desirable that conductive fiber assembly belonging to the first particle size distribution peak is dispersed in the structure with the conductive fiber belonging to the second particle size distribution peak.

Particle size value of the second particle side distribution peak is desirable more than 5 time of the particle size value of the first particle size distribution peak.

The second fuel cell of this invention is characterized in that in a fuel cell with a conductive membrane clamped between a pair of electrodes, at least one of the electrodes is provided with a porous catalytic carrier comprising two particle size distribution peaks; that is, the first particle size distribution peak existing at the small particle size side and the second particle size distribution peak existing at the large particle size side, catalysts carried on the conductive fibers belonging to at least the first particle size distribution peak, and proton conductive material adhered on the surface of the conductive fiber surfaces so as to contact the catalysts.

The third fuel cell electrodes of this invention is characterized in that in a fuel cell electrodes provided with a porous material comprising a mixture containing conductive material carrying catalysts and proton conductive material, the porous material has two layers in different compactness.

Figure 4:
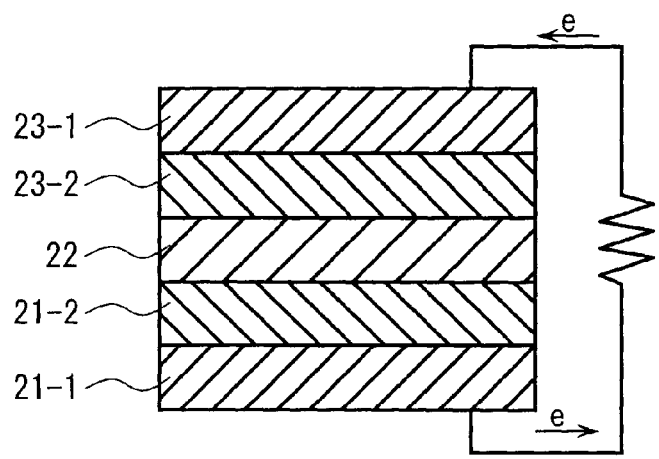
FIG. 4 is a schematic diagram showing one embodiment of the fuel cell of the present invention.

First, one example of the fuel cell of this invention will be shown in FIG. 4.

In FIG. 4, a fuel cell is constructed by sequentially laminating an anode electrode 21, proton conductive membrane comprising fluoro-macromolecule having sulfonic group 22 and a cathode electrode 23.

Further, the anode electrode 21 and the cathode electrode 23 shown in FIG. 4 are made of a collector 21-1 and a catalytic layer 21-1, a collector 23-1 and a catalytic layer 23-2.

For example, when mixed fuel comprising methanol and water is supplied to the anode electrode 21 and the oxidizing agent (air/oxygen gas) is supplied to the cathode electrode 23, the catalysis shown by the chemical formula (1) and chemical formula (2) are taken place in the catalytic layers 21-1 and 23-2, respectively.

Anode: (1)

Cathode: (2)

Proton thus generated in the anode catalytic layer 21-1 moves to the conductive membrane 22 and electron moves to the anode collector 21-1. In the cathode catalytic layer 23-2, the electron supplied from the cathode collector 23-1 is reacted with proton and oxygen supplied from the proton conductive membrane 22 and current is flown between the electrodes.

The collector 231-1 or 23-1 functions as an electron conduction path contributed to the reaction of the catalytic layer 21-1 or 23-2, and when the conductivity of electron of the catalytic layer 21-1 or 23-2 is high, the collector may not be required and the electrode layer can be constructed by the catalytic layer 21-2 or 23-2 only. Further, as fuel or oxygen is supplied to the catalytic layer 21-2 or 23-2 through the collector 21-1 or 23-1, the collector is formed using a porous material having sufficient openings to allow fuel or oxygen to pass through.

Figure 5:
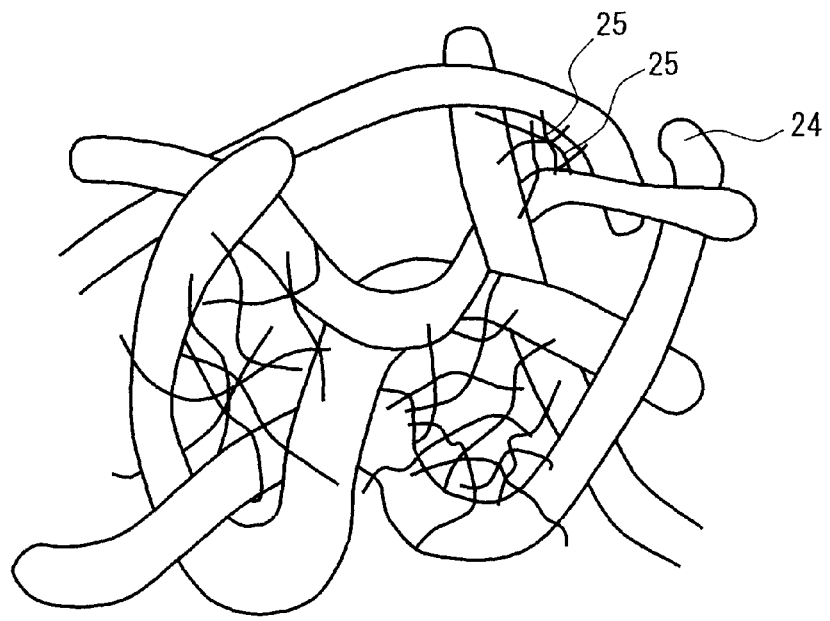
FIG. 5 is an enlarged view showing one embodiment of a catalyst layer that is used in the fuel cell of the present invention.

FIG. 5 is an enlarged sectional view conceptually showing the structure of the catalytic layer 21-2 or 23-2 and explains one embodiment of this invention.

The catalytic layer is provided with a conductive fiber that has two particle size distribution peaks; the first particle size distribution peak existing at the small particle size side and the second particle size distribution peak existing at the large particle size side. Hereinafter, the conductive fiber having particle size belonging to the first particle size distribution peak is called as the carrier fiber and the conductive fiber having the particle size belonging to the second particle size distribution peak is call as the skeletal fiber, and the first embodiment will be explained.

The structure of the catalytic layer is formed with conductive fiber 24 such as carbon fibers, for example, relatively large particle size in small diameter 100 nm~1 μm, long diameter 1 μm~1000 μm. This conductive fiber 24 has a large particle diameter and therefore, the structure as the catalytic layer is easy to maintain and improves the electron conductivity of the catalytic layer.

On the other hand, in some of clearances of the structure formed by the skeletal fiber 24, there are carrier fibers 25 of carbon fibers in relatively small particle size, for example, short diameter 5~100 nm tangling in a group (an aggregate). On the surface of this carrier fibers 25, fine catalysts are carried thickly.

That is, in the structure formed by the skeletal fibers 24, relatively large clearances are formed and some of them are filled with aggregates of the carrier fibers 25. Therefore, aggregates of carrier fibers are formed as dispersed in the catalytic layer and a catalytic layer formed with skeletal fibers, large pores without filled with carrier fibers and composite pores comprising small pores formed in the aggregates of the carrier fibers 25.

As a result, the diffusion of fuel, etc. in the catalytic layer is maintained and it becomes possible to secure amount of catalysts in catalytic layers by carrier fibers.

Further, on the surfaces of the skeletal fiber 24 and the carrier fiber 25, proton conductive material is formed to give the proton conductivity to the catalytic layer and functioning as a bonding layer of the fibers, serves for maintaining the shape of the catalytic layer.

Further, the conductive fiber in small particle diameter are called as the carrier fiber. This merely means that carrier fibers are able to carry catalysts at a density higher than conductive fibers and does not deny to have skeletal fiber to carry catalysts, and it is preferred to have the skeletal fibers to carry catalysts so as to increase amount of catalysts.

The catalytic layer that has skeletal fibers and carrier fibers can be formed with conductive fibers having more than two particle size distributions and normally, it is obtained by selectively laminating conductive fibers (carrier fiber) in small particle size on conductive fibers (skeletal fiber 24) in large particle size. However, electrodes or fuel cell of this invention are not restricted to those obtained according to this manufacturing method.

Conducive fibers involved in this invention are conductive fibers having more than two particle size distributions as described above.

For example, fibers of which aspect ratio is 1:10~1000 and particle size at the second particle size distribution peak is 5~500 times of the particle size value of the first particle size distribution peak are preferred.

That is, when the particle size value of the second particle size distribution peak is smaller than 5 times, the skeletal fibers and carrier fibers are uniformly mixed and aggregates of carrier fibers may not be formed. As a result, pores formed in the catalytic layer are made uniform.

On the other hand, when a difference in the peak particle sizes is larger than 500 times, clearances in the structure formed by the skeletal fibers become too large and carrier fibers may be held in the clearances in the skeletal fibers.

Definitely, it is preferred that using conductive fibers in long diameter of the particle size distribution peak of skeletal fiber 1 μm~10 μm and long diameter of the carrier fibers 50 nm~1 μm or short diameter of skeletal fiber at the particle size distribution peak 100 nm~1 μm and short diameter of carrier fibers at particle size distribution peak 5 nm~100 nm, a catalytic layer of a mean pore diameter formed by skeletal fibers in catalyst 100 nm~10 μm and a mean pore diameter formed by the carrier fibers 1 nm~10 μm pore diameter distribution is given as a catalytic layer. When the pore diameter in the catalytic layer exceeds 10 μm, the content ratio of carrier fiber of carrier fibers drops and furthermore, catalyst amount per unit volume in the catalytic layer drops. When the pore diameter in the catalytic layer becomes smaller than 1 nm. It becomes difficult to disperse fuel etc. in the group of carrier fibers and the using efficiency of catalysts is lowered.

(Carbon Nano-Fiber Manufacturing Method)

As materials that are used for conductive fibers, carbon material, metal material, semiconductive or insulative materials coated with conductive materials are usable. However, when the shape described above is considered, carbonic materials, especially, so-called carbon nano-fibers can be optimum materials and its manufacturing method will be explained.

Using such metals as nickel, iron, cobalt, oxides of these metals or powder of their mixture and alloys as generating catalysts, carbon nano-fibers are obtained by decomposing source gas and separating fiber state carbon by catalyzing this generating catalysts to raw materials such as hydrocarbon in the heating atmosphere of 500~1000° c.

Further, when carbon nano-fibers are generated in the environment impressed with the electric field, carbon nano-fibers are oriented in the electric field direction and grow in the relatively linear shape. However, when carbon nano-fibers are used in this invention, clearances tend to be formed between carbon nano-fibers and it is therefore preferred not to allow carbon nano-fibers to have orientation and accordingly, it is preferred to grow carbon nano-fibers in the state without the electric field impressed.

The short size of carbon nano-fibers can be controlled by particle size of, for example, catalytic powder for generation and particle size of catalytic powder for normal generation and the obtained short size of carbon nano-fibers become almost the same.

Accordingly, it is desirable to use catalyst powder for generation in particle size 100 nm~1 μm when manufacturing skeletal fibers and catalyst powder for generation in particle size 5~100 μm when manufacturing carrier fibers.

On the other hand, the long size of carbon nano-fibers differs depending on supplied source gas density, generating temperature, generating time and particle size of catalyst for generation. For example, at the conditions of source gas density 15%, generating temperature 700° C. and generating time 1 hour, carbon nano-fibers of long size 5 nm~1 μm are produced when the particle size of catalyst for generation is 5 nm while carbon nano-fibers of long size 1 μm~10 μm are produced when particle size of catalyst for generation is 100 nm.

Further, by the heating to generate carbon nano-fibers, particles of catalysts for generation grow and become bulky and carbon nano-fibers in desired size may be obtained. So as to prevent such the particle growth of catalysts for generation, fine particles of metal oxides that are particle growth inhibitor and hardly irreducible, for example, alumina powder in the similar particle size as catalyst for generation can be added to source material powder.

After manufacturing catalysts for growth in different particle size using separate reactors, both of obtained carbon nano-fibers are may be mixed, formed to membrane and used for the catalytic layers, and using mixed powder of carbon nano-fibers in different particle sizes, manufacture a mixed powder of carbon nano-fibers in different particle sizes (mixed fibers), this mixed powders may be formed to membranes and used for the catalytic layers. This is because the mixed state of carbon nano-fibers in the generated state differs from the distribution state when the catalytic layer is finally formed as a result when conductive fibers (skeletal fibers and carrier fibers) are once dispersed uniformly as described in the membrane forming method described later in order to distribute skeletal fibers uniformly when the normal catalytic membrane layer is formed.

Further, as a method to obtain mixed powders of carbon nano-fibers in different particle sizes, there is also a method to use secondary particles obtained by granulating plural primary particles.

For example, when secondary particles in particle size 100 μm obtained by aggregating primary particles in particle size 10 nm are used as generation catalysts, carbon nano-fibers in short size of 100 μm dependent on secondary particle size are first generated and then, secondary particles are decomposed to primary particles and thereafter, carbon nano-fibers in short size of 10 nm dependant on the primary particles grow. When such secondary particles are available for generating catalyst, mixed powders of carbon nano-fibers having two particle size distributions can be easily manufactured.

Further, this generating catalysts are not needed as electrodes and when alloyed with catalysts for electrodes and may possible drop characteristics of catalyst for electrodes. Therefore, it is preferred to dissolve and remove generating catalysts by dipping carbon nano-fibers in, for example, acid solution after generating carbon nano-fibers. Further, when treated in acid solution, component of acid solution may adhered to the surfaces of carbon nano-fibers and drop the carrying capacity of catalyst for electrode. So, it is preferred to improve the carrying capacity of catalyst for electrode adhered to carbon nano-fibers by attaching hydrogen to carbon nano-fibers by heating in the hydrogen atmosphere when necessary.

On the other hand, it is reported that there are two kinds of carbon nano-fibers obtained as described above; that is, the one is fiber of which c-face of the carbon crystal faces becomes parallel to the fiber length direction (a so-called carbon nano-tube) and the other is a fiber of which c-faces are in the stacked shape in the fiber length direction (carbon nano-fiber in a so-called herringbone structure or a platelet structure) according to kind of generating catalyst, source gas or heating condition.

On the other hand, the inventor and others of this invention confirmed that fine catalysts are generated according to a catalyst carrying method (catalysts for electrodes) described later. That is, it was detected that carbon nano-fibers of high exposing rate of the c-face side realized by stacking the c-faces in the fiber length with the c-face side exposed to the fiber side like carbon nano-fiber in the herringbone structure or the platelet structure are suitable for conductive fibers, especially for carrier fibers. Definitely, when carbon nano-fibers with the c-face tilted by 30~90°, preferably 45~90° in the fiber length direction are used as conductive fibers, the carrying volume of catalysts (catalysts for electrodes) can be improved.

(Method for Carry Catalysts on Conductive Fibers)

Next, a method to carry catalysts (catalysts for electrodes) of this invention on conductive fibers such as carbon nano-fibers will be explained.

First, a material that activates the reaction shown in the above-mentioned expression (1) or (2) is used for catalysts for electrodes; for example, platinum particles or alloy particles of platinum with more than one elements selected from element of the platinum group (for example, Ru, Rh, Ir, Os or Pd) and the fourth and fifth period transition metals are used.

More definitely, for catalysts for anode electrodes Pt—Ru is pointed out and for catalysts for cathode electrodes, Pt is pointed out but not especially restricted to these materials and Pt—Ru—Ir, Pt—Ru—Ir—Os, Pt—Ir, Pt—Mo, Pt—Fe, Pt—Co, Pt—Ni, Pt—W, Pt—Sn are also pointed out.

Further, the less the particle sizes of these materials are small, the more the catalytic activity becomes high. Therefore, particle sizes of catalysts formed in conductive fibers are preferred to be less than 20 nm.

One example of a method to carry such catalysts for electrodes on the conductive fiber surfaces will be explained.

First, suspend conductive fibers in water and heat to 40~100° C. and then, add raw material of catalysts for electrode.

Salts of catalysts for electrodes can be used as the raw material of catalysts for electrodes. For example, when platinum particles are obtained as catalysts, for example, chloroplatinic acid ($H_2PtCl_6$) is usable.

Make the suspension to acidic solution by dissolving such the raw material is dissolved in the suspension.

Add alkali into acidified suspension and neutralize it by continuously heating and generate hydroxide of material composing catalysts for electrodes, for example, $Pt(OH)_4$ and carry this hydroxide on the conductive particle surfaces. Further filter and dry this suspension and obtain catalytic carrier carrying $Pt(OH)_4$.

Further, the water washing and filtering of this catalytic particles may be repeated as necessary to remove impurity ion generated from the neutralization.

When conductive fibers carrying such hydroxide as $Pt(OH)_4$ are put in the reduction atmosphere and catalysts such as platinum is generated by reducing the hydroxide, catalytic particles for electrodes are carried on the surfaces of conductive fibers.

A reduction atmosphere including reduction gas such as hydrogen is preferred and a temperature range is 100~900° C. and preferably, 200~500° C. When reduction temperature is lower than 100° C., the crystallization of platinum group metal particles becomes insufficient and when used for electrodes, the particle size tend to increase. When the reduction temperature is higher than 900° C., the particle size of platinum group metal particles tends to increase and the catalytic activity per unit weight drops for reduction of the specific surface.

A carrying volume of electrode catalysts for conductive fibers is desirable in a range of 5~80 weight %. When less than 5 weight %, the battery performance is not obtained and when more than 80 weight %, the conductive fibers cannot be carried properly on catalytic carriers.

Next, a method to form membranes made of proton conductive material on the surfaces of conductive fibers and a catalytic layer will be explained.

First, any materials that are capable of transmitting proton are usable as a proton conductive material. Definite materials are shown below but not restricted to them. For example, such inorganic materials as fluorocarbon resin containing sulfonic acid group, tungstic acid and phosphotungstic acid are pointed out.

The volume of proton conductive material is in a range of 1~40 weight portion for conductive fiber 100 weight portion and a especially preferred range is 10~200 weight portion. When 1 weight portion, proton conductive material is insufficient, resistance increases and the battery performance drops. Further, at above 400 weight portion, electronic resistance increase and further, pores are filled with proton conductive material and fuel dispersion rate drops and the battery performance drops.

Put conductive fibers (skeletal fibers and carrier fibers) and proton conductive material at the ratio described above in water or organic solvent or mixed solution of them, uniformly disperse in water, dissolve with a dispersing machine and adjust slurry.

For example, using a collector (carbon paper/carbon cloth) as a support medium, after the repellent process, apply obtained slurry on the surface of this support medium and dry the applied slurry. Thus, a proton conductive material layer can be given to the conductive fiber surface carrying catalysts.

On the other hand, when drying slurry, the structure of the catalytic layer is formed by skeletal fibers and carrier fibers are entangled in, for instance, small clearances in the structure. In the portions with carrier fibers entangled, clearances become further small and therefore, other carrier fibers are easily entangled in the clearances. As a result, of clearances formed with skeletal fibers, those clearances once entangled with carrier fibers, the carrier fiber density is increased selectively and in the finally obtained catalytic layers, a variance is produced in the carrier fiber density distribution.

Further, it is preferred to adjust slurry components so that volumes of solid components in the slurry fall in a range of 5~60 weight %. When the volume of solid components is less than 5 weight %, no membrane is formed on collectors, proton may possibly pass through apertures of collectors. On the other hand, when the volume of solid component exceeds 60 weight %, the obtained catalytic layers may possibly be stripped off from the collectors.

Further, there is a method to give the proton conductive material after making the membrane of conductive fibers.

First, apply the solution of conductive fibers uniformly dispersed in water or organic solvent on the surface of the support medium such as, for example, a collector. The dispersed solution is filtered by the collector and the conductive fiber layer is formed on the collector. When necessary, the conductive fiber layer is dried after the thickness of the layer is unified using a technique like a paper making.

After forming membranes on conductive fibers, dip this membrane in a proton conductive material dissolved solution or a suspended solution and dried. Thus, proton conductive material membranes are formed on the surfaces of conductive fibers.

Further, when mixing skeletal fibers and carrier fibers, they are not dispersed after mixed but fibers may be dispersed, sucked, filtered or strained for every kind of fibers.

The above-mentioned reduction process of catalysts for electrodes carried on the conductive fiber surfaces can be made in the drying process for forming catalytic layers simultaneously and thus, the electrode manufacturing process can be simplified.

Thickness of the catalytic layer manufacture as described above differs depending on characteristics demanded for cells and normally catalytic layers can be 10~500 µm thick.

Second Embodiment

Next, another embodiment of this invention will be explained.

For example, in a fuel cell using methanol and water as fuel, liquid fuel is supplied to an anode electrode. On the other hand, an anode electrode made of porous materials is used in order to efficiently use catalysts in the electrode.

When liquid fuel reaches the proton conductive membrane by passing through the pore in the anode electrode, liquid fuel is transmitted to the proton conductive membrane and arrives at the cathode. As a result, fuel reacts directly with oxygen supplied to the cathode electrode and the cell may not function as a cell.

This embodiment resolves the said problem and a cross-sectional view of this embodiment is shown and explained below.

Figure 6:
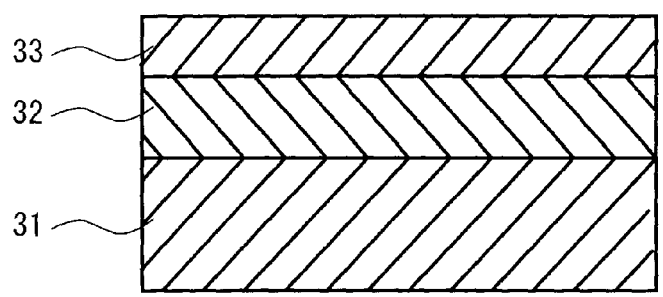
FIG. 6 is a sectional view showing one embodiment of the fuel cell of the present invention.

An electrode shown in FIG. 6 has a laminated catalytic layer formed on the surface of a collector 31 by sequentially laminating a catalytic layer 32 (herein after, called as a sparse catalytic layer) having large pores or a high porosity and a catalytic layer 33 (herein after, called as a thick catalytic layer) having smaller pore sizes than the sparse catalytic layer 32.

This electrode is used as an anode electrode 21 shown in FIG. 4 and the thick catalytic layer 33 is arranged so as to adjoin the proton conductive membrane.

Liquid fuel supplied to the collector 321 formed by porous material passes through the opening of the collector 31 and permeate into the pores in the thick catalytic layer 32. However, it is difficult to pass through the thick catalytic layer 33 of which pore openings are small and porosity is low and therefore, fuel may not arrive at the proton conductive membrane.

The sparse catalytic layer 32 may be in a structure using the skeletal fibers carrying electrode catalyst described in the first embodiment as conductive fibers and with conductive fibers forming the structure coating proton conductive material as a membrane likewise the first embodiment and furthermore, also can be the structure entirely same as the first embodiment wherein carrier fibers are dispersed in the skeletal fibers and the surfaces of skeletal fibers and carrier fibers are coated with membranes of proton conductive material.

In the sparse catalyst layer obtained, it is preferred that pore sizes are widely dispersed in a range of the porosity 50~90% and a mean pore size 100~1 µm. When the porosity is below 50% and a mean pore size is smaller than 100 µm, it becomes difficult to diffuse fuel in the sparse catalytic layer 32 and when the porosity is much more than 90% or larger than 1 µm, the catalytic density in the sparse catalytic layer 32 becomes low.

For the thick catalytic layer 33, for example, carrier fibers described in the first embodiment can be used. However, in case of powder of fibers, the porosity tends to become high and pore size also tends to become large and therefor, it is desirable to use ordinary flat-less conductive particles.

Definitely, it is preferred to form the thick catalytic layer 33 with conductive particles of a mean particle size 10~100 nm and an aspect ratio 1:1~5, and it is desirable to make the porosity of the obtained thick catalytic layer at below 30% and a mean pore size 10~50 nm. It is difficult to obtain conductive catalytic carrier in particle size 10 nm and when the particle size exceeds 100 nm, the porosity may possibly exceeds 30% or the pore size exceeds 50 nm and as a result, liquid fuel may pass through the thick catalytic layer 33.

Any material that is conductive are not especially restricted and usable and carbon materials, for example, carbon black, etc. except carbon nano-fibers can be used.

Pores existing in a thin catalytic layer 33 are desirable in a mean fine size below 1 µm and a porosity below 50% and both of them are further smaller values. When a mean fine pore size or a porosity are larger than the values mentioned above, liquid fuel may possibly pass through fine pores of the thick catalytic layer 33.

Further, the catalysts for electrodes in the thick catalytic layer 33 have a low fuel supply capacity except those catalysts existing on the interface with the sparse catalytic layer 32 and are not able to fully display the function as catalysts and therefore, it is desirable to make their thickness to less than ⅕ of the film thickness of the sparse catalytic layer 32. In other words, when the film thickness of the thick catalytic layer 33 is thicker than ⅕ of the film thickness of the sparse catalytic layer, the catalyst using efficiency is lowered and the electricity generated per the electrode volume drops. A definite film thickness is desirable to be less than 100 µm.

Further, the film thickness of the thick catalytic layer is desirable above 1 µm. If the film thickness is smaller than 1 µm, liquid fuel may possibly pass through the thick catalytic layer.

The conductive fiber manufacturing method, the catalytic carrying method to conductive fibers and the sparse catalytic layer forming method can be made in the similar manner as the method for forming the catalytic layer in the first embodiment.

The catalyst carrying method to conductive particles can be made in the similar manner in the first embodiment except using conductive particles instead of conductive fibers used in the first embodiment.

Because it is difficult to form a thick catalytic layer directly on the surface of the sparse catalytic layer, after forming a film on the smooth surface of the transfer base substance prepared separately, transfer the formed thick catalytic layer on the surface of the sparse catalytic layer from the transfer base substance. Further, the method to form a thick catalytic layer on the surface of the transfer base substance can be processed in the same manner as in the first embodiment except use of conductive particles for conductive fibers used in the first embodiment.

(Fuel Cell Manufacturing Method)

A fuel cell manufacturing method using the electrodes shown in the first or the second embodiment will be explained.

Prepare a pair of cathode electrode and anode electrode shown in the first embodiment or the anode electrode and any cathode electrode shown in the second embodiment and proton conductive membrane formed by such proton conductive material as fluoro-polymer molecule having carboxylic acid radical. When, for example, Nafion 117 [Trade Name: DuPont made] that is a fluoro-polymer molecule material having carboxylic acid radical is used as a proton conductive membrane, its film thickness can be 50~200 µm.

A fuel cell (Membrane Electrode Assembly: MEA) can be manufactured by thermally compressing a laminate comprising this proton conductive membrane clamped with a pair of electrodes using a roll or a press. The thermally compressing conditions at this time, are: temperature 70~180° C., pressure 10~200 kg/cm$^2$, and pressing time 1~30 min. When the pressure, temperature or time are lower or shorter than these values, the pressing is insufficient and resistance as an electrode is high and therefore, the battery performance may become worse. On the other hand, when the pressure is higher, the temperature is higher and a time is longer than the above-mentioned values, the deformation, decomposition of the proton conductive membrane and the deformation of collectors become large and fuel and oxidizing reagent may not be properly supplied into the electrodes or the characteristics of the proton conductive membrane may be dropped.

EMBODIMENTS

The embodiments of the present invention will be explained below in detail referring to the above-mentioned drawings.

Embodiment 1

Weighing nickel oxide in a mean particle size of primary particle 50 nm (Kojundo Chemical Laboratory: NI004PB, Purity 99.9%) and copper oxide (Kanto Kagaku made Trade Name: JIS Special Class Powder) so that the atomic ratio of Ni and Cu after reduced becomes 1:1, and mixing δ-phase alumina (Nippon Aerosil) in a mean particle size 30 nm to 5 volume % to the volume of Ni an Cu, raw material powder was manufactured.

Then, mixed power comprising 3 kinds of powders of nickel oxide, copper oxide and alumina are mixed and pulverized for 1 days using a planetary ball mill comprising a alumina ball and a container.

After mixing, put the powder in a crystal made boat and set in a tubular furnace. Then, reduce the inside of the tubular furnace by supplying a 1:1 mixed gas of hydrogen and argon mixed at 100 ml per min. and the temperature was increased by 10° C./min. up to 200° C. and held for 10 min. Thereafter, changing the mixing rate of gas gradually to 100% hydrogen gas of 1000 ml/min., the temperature was raised up to 700° C. at the temperature rising speed of 5° C./min. During this temperature rising process, nickel oxide and copper oxide were all reduced or alloyed. A mean particle size of this alloy particle was 0.1 μm.

When the temperature in the reaction furnace reaches 700° C., ethylene gas was supplied at 70 ml/min. and mixed with hydrogen gas and carbon nano-fibers were grown by the thermal CVD in the hydrogen-ethylene mixed gag atmosphere.

After this thermal CVD process was completed, the sample was cooled in the furnace and taken out. Then, when the change in weight was measured, carbon nano-fibers of about 10 times in weight when compared with a catalyst composed of Ni—Cu was generated.

When the above-mentioned carbon nano-fibers were observed with an electronic microscope, it was found that Herringbone type carbon nano-fibers with the C-face is arranged at nearly 45° C. were generated. Further, it was found that in the range of diameters 200~700 nm, more than 80% was occupied by this carbon nano-fiber.

Further, when this carbon nano-fiber was analyzed by the TCD method, it was detected that 0.7% weight % hydrogen element was contained. In addition, when its ash was analyzed for detecting a contained element, alumina was detected. Further, the specific surface area of the generated carbon nano-fiber was 310 m$^2$/g.

Then, carbon nano-fiber was immersed in chloroplatinic acid aqueous solution. The density of chloroplatinic acid was converted to become 10 weight % Pt to carbon nano-fiber. Then, after boiling for one hour, sodium hydrogen carbonate aqueous solution was dropped for about 30 min. After dripping, the solution was flown back for two hours. Further, the volume of sodium hydrogen carbonate was 3.2 times of chloroplatinic acid and dripped until the solution was alkalified. Thereafter, the sample was transferred in pure water and further boiled and cleaned.

After cleaned, a small amount of aqueous solution in which carbon nano-fiber was dispersed was sample, and a 100 mg carbon nano-fiber layer was deposited on a 10 cm$^2$ Tore made carbon paper TGP-H-030 using the suction filtration method.

Then, the carbon paper with carbon nano-fiber deposit was moved in a dryer and dried at 100° C. for 12 hours. This sample was put in an atmospheric furnace and reduced at 200° C. for 10 hours in the atmosphere by flowing 100% hydrogen at 200 ml/min.

When the reduced sample in the above process was observed with a TEM, fine particles of Pt in mean particle size of 2~3 nm were adhered on the wall surfaces of carbon nano-fibers at average 5×10$^{16}$ pieces/m$^2$.

Further, when the element analysis was made at the same time using the TEM-EDX, it was found that Ni, Cu and Pt were alloyed at a rate of 1:1:1. Further, the portion wherein alumina particles were mixed with the carbon nano-fibers was observed.

Next, the carbon paper on which the carbon nano-fiber layer was formed was immersed in 2% Nafion solution and Nafion was impregnated. After impregnated, the sample was pulled out from the solution and dried in a drier at 100° C. The impregnation was made by repeated for 3 times. After the impregnation, the weight was measured and found it was increased by 30 mg.

Thus, an electrode layer comprising carbon nano-finer impregnated with perfluorosulfonic acid polymer (Trade Name: Nafion) and fine particles of Pt dispersed high thickly on the surface and oxide particles could be formed on a collecting plate made of carbon paper.

On the other hand, using anode electrodes manufactured by coating a slurry composed of Ketjenblack EC made by AKZO NOBEL as an electrode carrier carrying 30 weight % Pt—Ru catalyst, 20% perfluorosulfonic acid polymer (Trade Name: Nafion) and 2-ethoxy-ethanol on the Toray made carbon paper TGP-H-090, a membrane electrode assembly (MEA) was manufactured by putting a perfluorosulfonic acid polymer membrane (Trade Name: Nafion 117) between the anode electrodes at the temperature 100° C. and the pressure 100 kg/cm$^2$.

Using this MEA, the fuel cell was evaluated under the conditions of the test temperature 70° C., methanol fuel density 2 mol/l, fuel supply speed 1 ml/min. and cathode air volume 200 ml/min. with the result of the output of 80 mW/cm$^2$.

Further, a part of the cathode electrode layer of this fuel cell was cut off and the contained components were analyzed through the chemical analysis. Cu—Ni component was contained at a rate of 0.2~20 weight % against carbon nano-fibers. In addition, Al component could be detected from the cathode electrode layer.

Comparative Example 1

The AKZO NOBLE made Ketjenblack EC was dispersed in water and after its dispersibility was increased using ultrasonic wave for 30 min., dipped in a mixed aqueous solution of chloroplatinic acid, nickel chloride and copper chloride and boiled for one hour. Then, sodium bicarbonate aqueous solution of 3 ml was dropped for about 30 min. Thereafter, the solution was flown again for 2 hours. Then, the sample was moved in pure water, and boiled and cleaned. The cleaned sample was moved in a drier and dried for 12 hours at 100° C.

Then, the sample was put in an atmosphere furnace and the reduction was made in the atmospheric conditions of 100% hydrogen was flown at 200 ml/min. for one hour at 300° C.

After the reduction, the sample was observed with a TEM, it was detected that there are particles in the particle size 3~5 nm on the surface of Ketjenblack. Further, the composition of the above-mentioned metal particles was analyzed and measured, it was detected that Ni, Cu and Pt were alloyed at the rate of 1:1:9.

Slurry of carbon particles carrying the thus manufactured Pt alloy was produced by adding 20% perfluorosulfanic acid polymer membrane solution (Brand Name: Nafion) and 2-ethoxy-ethanol, and coated on Toray made carbon paper TGP-H-030, dried and a cathode electrode was manufactured.

Using the above-mentioned cathode electrode and an anode electrode similar to that manufactured in the embodiment 1, an MEA 1 was manufactured with a perfluorosulfanic acid polymer membrane (Trade Name: Nafion) put between the electrodes in the same process as in the embodiment 1.

Using this MEA, the same fuel cell as that in the embodiment 1 was evaluated and 40 mW/cm² output was obtained at 70° C.

Embodiment 2

In the same process as in the Embodiment 1, 100 mg carbon nano-fiber layer was deposited on a 10 cm² porous fluorocarbon resin (Trade Name: Teflon) sheet instead of a carbon paper according to the sucking and filtering method.

After deposited, the whole sheet of porous fluorocarbon resin (Trade Name: Teflon) with the carbon nano-fiber deposited was dried in a drier at 100° C. for 12 hours. When taken out from the drier after dried, the dried carbon nano-fiber layer was separated on the membrane from the porous fluorocarbon resin (Brand Name: Teflon) sheet.

Then, the above carbon nano-fiber self-support membrane was put on a quartz plate and put in an atmosphere furnace and reduced for 10 hours at 200° C. in the atmosphere with 100% hydrogen was flown at 200 ml/mil. ml/mil.

Then, the carbon nano-fiber self-support membrane in a 2% perfluorosulfonic acid polymer (Brand Name: Nafion) solution to impregnate the perfluorosulfonic acid polymer (Brand Name: Nafion). After impregnated, the self-support membrane was pulled out from the solution and dried at 100° C. in the drier. The impregnation was made by repeating this process 3 times and its weight was measured. 20 mg weight increase was observed.

Thus, a self-support electrode membrane impregnated with perfluorosulfonic acid polymer (Brand Name: Nafion) with Pt fine particles dispersed at high density and comprising of carbon nano-fiber and oxide particles could be formed.

On the other hand, using anode electrodes manufactured by coating a slurry composed of Ketjenblack EC made by AKZO NOBEL as an electrode carrier carrying 30 weight % Pt—Ru catalyst, 20% perfluorosulfonic acid polymer (Trade Name: Nafion) and 2-ethoxy-ethanol on the Toray made carbon paper TGP-H-090, a membrane electrode assembly (MEA) was manufactured by putting a perfluorosulfonic acid polymer membrane (Trade Name: Nafion 117) between the anode electrodes at the temperature 100° C. and the pressure 100 kg/cm².

Using this MEA, the fuel cell was evaluated under the conditions of the test temperature 70° C., methanol fuel density 2 mol/l, fuel supply speed 1 ml/min. and cathode air volume 200 ml/min. with the result of the output of 85 mW/cm².

Embodiment 3

The carbon nano-fibers synthesized according to the same method as that explained in the Embodiment 1 described above was cleaned in acidic solution. As the Ni—Cu alloy of the synthesized catalyst is dissolved in the acidic solution, the Ni—Cu alloy was removed by the acid treatment and carbon nano-fiber with alumina particles dispersed on the surface was obtained as a catalyst carrier.

With Pt micro particles carried on the obtained catalyst carrier in the same method explained in the Embodiment 1 described above and a fuel cell was manufactured using the obtained catalytic material similarly to the manner explained in the above Embodiment 1.

Embodiment 4

According to the same method as that explained in the Embodiment 3, the carbon nano-fiber with the alumina particles dispersed on the surface was obtained as a catalyst carrier. Except that this catalyst carrier is used, a fuel cell was manufactured in the same manner as explained in the Embodiment 2.

Embodiment 5

Using an iron oxide as a raw material of CNF synthetic catalyst instead of using nickel oxide and copper oxide, a CNF synthetic catalyst comprising of a mixture of Fe metal particles and alumina particles was obtained. A fuel cell was manufactured similarly as explained in the Embodiment 1 excepting the use of this CNF synthetic catalyst.

Embodiment 6

A fuel cell was manufactured similarly as explained in the Embodiment 2 excepting the use of the CNF synthetic catalyst synthesized in the Embodiment 5.

Comparative Example 2

After dispersing silicon dioxide powder in particle size 1 μm in a large volume of pure water, Cu nitrate, Ni nitrate were solved by boiling so as the atomic ratio of Cu and Ni becomes 1:1. Thereafter, adding ammonium bicarbonate ($NH_4HCO_3$), Cu and Ni were settled on the surface of silicon dioxide powder. When the obtained catalyst was observed, it was detected that CuNi particles in several ten nm were adhered on the silicon dioxide power surfaces.

Using the obtained catalysts as carbon fiber synthesizing catalysts, carbon nano-fiber were grown in the hydrogen vs ethylene mixed gas atmosphere (700° C.) according to the thermal CVD.

After this thermal CVC process was completed, the sample was cooled in the furnace and taken out. Then, when the change in weight was measured, carbon nano-fibers of about 15 times in weight when compared with a catalyst composed of Ni—Cu was generated.

When the above-mentioned carbon nano-fibers were observed with an electronic microscope, it was found that Herringbone type carbon nano-fibers with the C-face is arranged at nearly 45° C. were generated. Further, it was found that in the range of diameters 10~50 nm, more than 90% was occupied by this carbon nano-fiber.

Further, the specific surface area of the generated carbon nano-fiber was 50 m²/g.

Then, Pt fine particles in mean particle sizes 2~3 nm were carried on the obtained carbon nano-fibers in the same manner as explained in the Embodiment 1.

Using this catalyst carrier carbon nano-fibers, it was tried to manufacture cathode electrodes similarly as explained in the above Embodiments 1 and 2. However, no cathode electrode could be manufactured according to any methods.

The results of the embodiments and the comparative examples described above will be shown in Table 1.

Further, the definitions of the terms used or the measuring methods are as shown below.

The cathode porosity was computed from weights and densities of materials filled per unit volume.

The means particle sizes of the raw material of the CNF synthetic catalyst particles, CNF synthetic catalyst particles and fuel cell catalyst particles were computed by taking pictures at 20~100 thousand time magnifications and selecting 10~40 pieces of particles randomly and measuring the particle sizes using a transmission electron microscope and repeating this operation in 5~10 different visual fields.

Carry volume of fuel cell catalysts was computed from a weight difference of carbon nano-fibers before and after the carry.

The hydrogen content of carbon nano-fibers was obtained according to the quantitative mass spectrometry such as TCM, MS, etc.

The fuel cell catalyst compositions were obtained according to the quantitative analysis methods such as TEM-EDX, atomic absorption method, etc.

The output of a fuel cell at 70° C. is the output when 2M methanol was used as anode fuel, amount supplied at 2 mol/L/min. and the cathode air supplied at 200 ml/min. The output of a singe cell having an electrode area 10 cm$^2$ was evaluated.

TABLE 1

| | Cathode Porosity | Fuel Cell Catalyst Mean Particle Size | Catalyst Mean Carry Volume | Carbon fiber Hydrogen Content | Fuel Cell Catalyst composition | Output at 70° C. |
|---|---|---|---|---|---|---|
| EmbodiMent 1 | 40% | 3 nm | 0.1 mg/mm3 | 0.7 wt % | 9pt—1Ni—1Cu | 80 mW |
| Embodiment 2 (Self-Support Membrane) | 40% | 3 nm | 0.1 mg/mm3 | 0.7 wt % | 9pt—1Ni—1Cu | 85 mW |
| EmbodiMent 3 | 40% | 3 nm | 0.1 mg/mm3 | 0.7 wt % | Pt | 70 mW |
| Embodiment 4 (Self-Support Membrane) | 40% | 3 nm | 0.1 mg/mm3 | 0.7 wt % | Pt | 75 mW |
| EmbodiMent 5 | 40% | 2.5 nm | 0.15 mg/mm3 | 0.7 wt % | Pt—10Fe | 84 mW |
| Embodiment 6 (Self-Support Membrane) | 40% | 2.5 nm | 0.15 mg/mm3 | 0.7 wt % | Py-10Fe | 87 mW |
| Comparative Example 1 | 30% | 4 nm | 0.15 mg/mm3 | — | Pt—1Ni—1Cu | 84 mW |

As clearly seen from the results shown on Table 1, according to the embodiments, the output values at 70° C. of fuel cell manufactured according to this invention are all above 70 mW On the contrary, the result in the comparative example is less than 55 mW and it is shown that the power generating efficiency of the fuel cell of this invention is excellent.

On the contrary, according to Comparative Example 2 wherein carbon nano-fiber was synthesized by the thermal CVD using catalysts synthesized by the coprecipitation method, not only the self-support membrane as in the Embodiment 2 couldn't be formed but also the electrode layer couldn't be manufactured even by the slurry method shown in the Embodiment 1 and the characteristic as the fuel cell could not be highly evaluated.

Embodiment 8

By weighing nickel oxide and copper oxide in a mean primary particle size 40 nm so that the atomic ratio of the nickel and copper after reduced becomes 1:1, a raw material was prepared by mixing alumina in a mean particle size 30 nm so that it becomes 4 volume % of the nickel and copper volume.

The mixed raw materials were further mixed and pulverized to raw material powder for two days in an alumina made bolls and container using a planetary boll mill.

After mixed, the power was put in a quartz boat and set in a tubular furnace. Then, the inside of the tubular was displaced with a mixed gas of hydrogen and argon 1:1 by supplying at 1 lit./min, the temperature was raised to 200° C. and kept for 10 min. Then, the gas mixing ratio was gradually changed to 100% hydrogen gas at 1 L/min., the temperature was change to 500° C. and all of nickel oxide and copper oxide were reduced. After the reduction, these oxides were kept for 30 min. at 500° C. and completely alloyed and then, further raised to 700° C. A mean particle size of the thus obtained Cu—Ni alloy was 0.1 μm.

When 700° C. was reached, hydrogen gas was mixed with ethylene gas of 200 cc and carbon nano-fiber was grown for 10 min. according to the thermal CVD. When the grown nano fibers were cooled in the furnace, and taken out, and the weight was measured. It was about 60 times of the raw material powder.

When the above-mentioned carbon nano-fibers were observed with a transmission electron microscope, it was found that Herringbone type carbon nano-fibers with the C-face was arranged at nearly 45° C. were generated. Further, when observed with a scanning micron microscope, the multiple, a polycrystalline structure was observed. It was further found that in the range of diameters 100~200 nm, more than 50% was occupied by this carbon nano-fibers.

In the carbon nano-fibers, fine alumina powders were dispersed.

The specific surface area of this fibers was 400 m$^2$/g. Further, the roughness factor of this fiber was 40.

This fibers were dispersed in boiled water and chloroplatinic acid was added while boiling the water. The chloroplatinic acid was added by converting so that platinum becomes 15 weight % of the fibers. 30 min. after boiled again, sodium hydrogen carbonate solution was dripped in the water with fibers dispersed until it becomes pH 9 for 9 hours. After the dripping, the water was flown again for 2 hours, sucked and filtered and pure water was added to sediment, boiled and cleaned.

After reduced, when the sample was observed with an electron microscope, it was observed that fine platinum particles in particle size 1~3 nm were carried on the wall surface of the carbon nano-fibers.

When the X-ray diffraction analysis of this sample was conducted, crystal of platinum was recognized but nickel and copper were not recognized. Further, when the element analysis was made with the EDX, platinum, nickel, copper and carbon were recognized as primary components and in addition, a very small amount of aluminum was recognized by the ICP analysis.

100 mg of the carbon nano-fibers carrying platinum was dispersed in pure water and the sample was deposited on a conductive porous collecting plate using the suction filtration method. After deposition, the sample was dried and dipped in 2% Nafion solution and impregnated under the reduced pressure. Then, the sample was taken out from the Nafion solution, placed on a filter paper and dried in the air for one min. and then, further dries on a laboratory dish at a room temperature for 10 hours. After impregnated, the electrode weight was increased by 15 mg.

Figure 2:
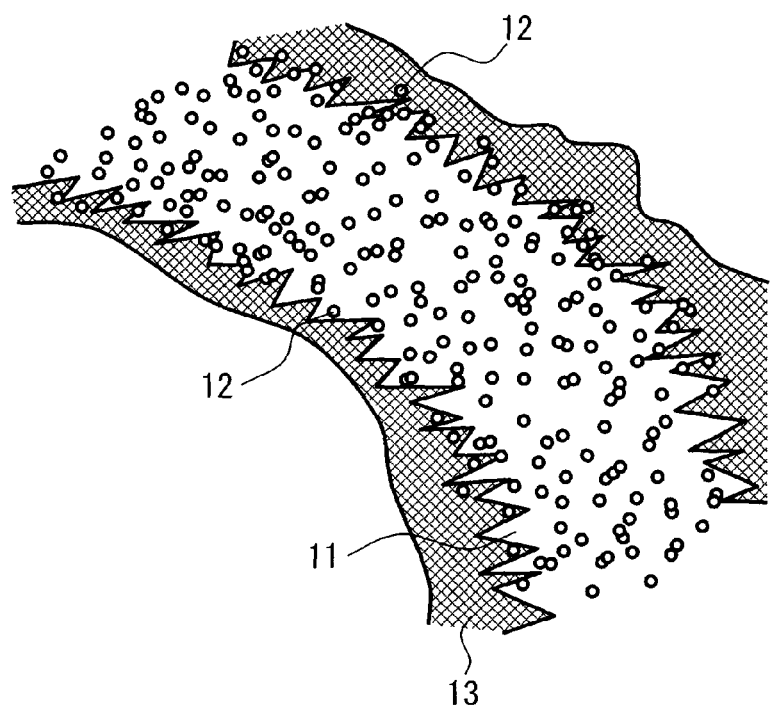
FIG. 2 is a schematic diagram showing the vertical sectional view of a fuel cell catalytic material shown in Embodiment 8.

Further, this electrode layer was cut to thin pieces and observed with a transmission electron microscope. As a result, the vertical section, the horizontal section and the presence of proton conductor could be observed. The schematic diagram of the vertical section of the carbon nano-fiber is shown in FIG. 2. As shown in FIG. 2, the carbon nano-fiber 11, the platinum catalyst 12 and the Nafion 13 were closely fitted without cause separation on the interface. When further observed at higher magnifications, it was observed that the platinum catalyst 12 is present in the inside of the carbon 11 and the Nafion infiltrated into the carbon 11.

In order to judge whether carrier catalyst and proton conductor are entered into the fiber, the cross sections of 20 pieces of the carbon were observed at 800000 times of magnifications and the number of fibers in which carrier catalysts and proton conductors were entered were measured and the percentage was obtained and it was recognized that the rate of fibers in which the carrier catalysts and proton conductors were entered occupied in the whole fibers is more than 10%. Further, the inside of the fibers referred to here denotes the area of which depth from the surface of the fiber is more than 20% of the radius of the fiber.

Using this electrode for the cathode and an electrode manufactured on Toray made carbon paper from slurry produced by mixing catalyst carrying 30 weight % of Pt—Ru on carbon black and Nafion 117 for the anode, and with Nafion 117 put between the electrodes as the electrolyte for a cathode side collector and an MEA was manufactured using carbon cloth of porosity more than 95% at 120° C. and the pressure 100 kg/cm$^2$. Using this MEA, a fuel cell was evaluated.

Comparative Example 3

Figure 3:
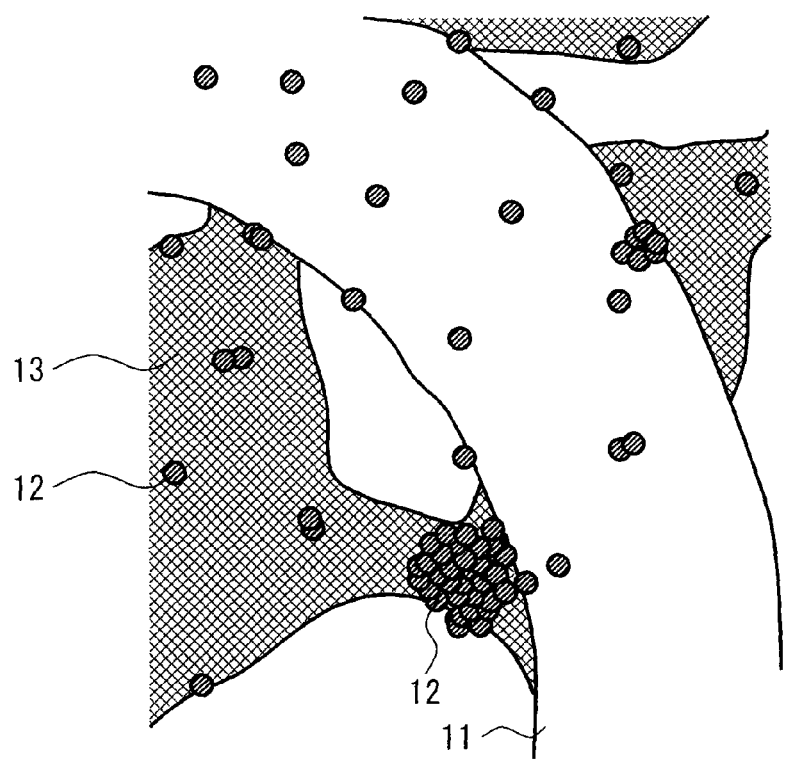
FIG. 3 is a schematic diagram showing the vertical sectional view of a fuel cell catalytic material shown in Comparing Embodiments 3~7.

As carbon fibers for a cathode electrode, nano horn in mean diameters and lengths shown in Table 2 shown below were prepared. By carrying a platinum catalyst on this nano horn according to the method conducted in the Embodiment 8, it was tried to form a catalytic layer in the same method. However, when the sample was filtered and dried on a carbon paper, it was cracked and separated and the catalytic layer couldn't be formed. For the purpose of comparison, the catalytic layer of the separated sample was impregnated with Nafion under the same conditions as in the Embodiment 8 and observed using a transmission electron microscope. The vertical sectional view of the carbon nano-fiber is shown in the schematic diagram in FIG. 3. As shown in FIG. 3, in the observation with a transmission electron microscope, the adhesion of the carbon fiber 11, the catalytic particles 12 and Nafion 13 was bad and the portions of Nafion that were not in contact with the catalyst surface was conspicuous.

Comparative Example 4

As carbon fibers for a cathode electrode, carbon fibers in mean diameters and lengths shown in Table 2 shown below were prepared. By carrying a platinum catalyst on this carbon fibers according to the method conducted in the Embodiment 8, it was tried to form a catalytic layer in the same method. However, when the sample was filtered and dried on a carbon paper, it was cracked and separated and the catalytic layer couldn't be formed. For the purpose of comparison, the catalytic layer of the separated sample was impregnated with Nafion under the same conditions as in the Embodiment 8 and observed using a transmission electron microscope.

In the observation with a transmission electron microscope, the adhesion of the carbon fiber, the catalyst and Nafion was bad and the portions of Nafion that are not in contact with the catalyst surface was conspicuous.

Comparative Example 5

Excepting the use of paper phase growth carbon fiber (VGCF) in mean diameter and lengths shown in Table 2 below as carbon fiber of the cathode electrode, in the same manner as explained in the above Embodiment 8, fuel cells were manufactured.

In the observation with a transmission electron microscope, the adhesion of the carbon fiber, the catalyst and Nafion was bad and the portions of Nafion that are not in contact with the catalyst surface was conspicuous.

TABLE 2

| Test No. | Mean Diameter (mm) | Length (μm) | Specific Surface Area by BET Method (m2/g) | Separation of Catalytic Layer | Presence of Three Phase Interface |
|---|---|---|---|---|---|
| Comp. Example 3 | 3 | 0.01 | 750 | Yes | No |
| Comp. Example 3 | 50 | 1 | 50 | Yes | No |
| Comp. Example 3 | 150 | 10 | 12 | No | No |

Regarding Comparative Examples 3 and 4, because no catalyst could be produced, slurry was produced in the same procedures as for producing the anode in the Embodiment 8 and coated on a carbon paper. The ratio of platinum carrying carbon fiber and Nafion was made the same as the cathode in the Embodiment 8. As a result of the coating of the slurry, regarding the Comparative Example 4, the sample was separated from the carbon paper and no electrode could be produced according to both methods.

Regarding Comparative Examples 3~5, the presence of the carrying catalyst and proton conductor in the inside of fiber was checked as in the Embodiment 8. When the cut surfaces of 20 carbon fibers of the electrode were observed with a transmission electrode microscope, catalysts were carried only on the surfaces of any fibers and there was no indication of catalysts entered into the inside. Further, catalysts carried and cohered on the fiber surfaces were conspicuous and carrier catalysts not cohered are about 10 nm in particle size and larger by 3~4 times of catalysts carried on the fibers in the Embodiment 8. Further, the catalyst carry density was also low and the volume of catalyst per unit area was one several portions of the fibers in the Embodiment 8.

An MEA was manufactured likewise the Embodiment 7 by combining the cathode electrodes in the Comparative Examples 3, 5 with the anode electrode likewise in the Embodiment 8 and a fuel cell test was conducted.

Comparative Example 6

Excepting the use of 10% Nafion solution when impregnating Nafion into carbon nano-fibers for the cathode, an electrode was manufactured likewise the Embodiment 8. As a result, when the electrode layer was dipped in the Nafion solution and the pressure was reduced, the half of the electrode layer was separated from the carbon paper. The electrode layer was pulled up from the Nafion solution, pasted again to the carbon paper and dried. Then, an MEA was manufactured in the same manner as in the Embodiment 8 and the cell performance was measured.

A sample similar to the carbon nano-fiber cathode which was measured for the cell performance was measured was manufactured, sliced into thin pieces and its structure was observed with a transmission electron microscope. As a result, portions where Nafion was not closely in contact with carbon nano-fibers and carried platinum particles were conspicuous and much bubbles were observed in the electrode layer.

Comparative Example 7

A cathode electrode was manufactured using carrier carbon (particles) similar to that used for the anode electrode in the Embodiment 8. The volume of carrying platinum was 15%, the volume of Nafion was 25% to the platinum carrying carbon. An MEA was manufactured by combining this cathode electrode with the anode electrode used in the Embodiment 8.

When this electrode was observed with a transmission electron microscope, catalysts separated from the particle carbons were observed remarkably, the distribution of Nafion was not uniform and portions without Nafion attached were observed conspicuously.

The utilization ratio of catalysts and oxidizing reagents of fuel cells in the Embodiment 8 and the Comparative Examples 3~7 were measured and the results are shown in Table 3 shown below. The conditions for measuring the oxidizing reagents utilization ratio are methanol fuel density 1 mol, cathode air flow rate 60 ml/min, and the conditions for measuring the catalysts utilization ratio are methanol fuel density 1 mol and the cathode air flow rate 500 ml/min.

TABLE 3

| Sample | Oxidizing Reagent Utilizing Ratio (%) | Catalysts Utilizing Ratio (%) |
|---|---|---|
| Embodiment 8 | 32 | 68 |
| Comparison Example 3 | 11 | 42 |
| Comparison Example 4 | — | — |
| Comparison Example 5 | 10 | 20 |
| Comparison Example 6 | 18 | 49 |
| Comparison Example 7 | 8 | 30 |

As clearly seen from Table 3, the fuel cell in Embodiment 8 has higher oxidizing reagent utilizing ratio and the catalysts utilizing ratio than Comparison Examples 3.5~7.

Further, the MEA manufactured in Embodiment 8 and the MEA used in Comparison Example 7 were operated for 500 hours by applying constant current (100 mA/cm$^2$) under the conditions shown above. As the result, regarding the MEA in Embodiment 8, voltage drop was about 3% but regarding Comparison Example 7, the voltage drop of about 50% was recognized. From this, the catalysts on carbon nano-fibers are excellent in the stability for the extended period.

Embodiment 8-1

Nickel oxide of mean primary particle size 50 nm (Brand Name of Kojundo Chemical Laboratory: NI004PB, purity 99.97%) and copper oxide (Brand Name of Kanto Chemical: JIS Special Class Powder) were weighed so that the atomic ratio of reduced Ni and Cu becomes 1:1 and mixed with δ-phase alumina (Nippon Aerosil) in mean particle size 30 nm so as to become 10 volume % against the volume of Ni and Cu and thus, raw material powder was manufacture.

Then, the mixed powder comprising 3 kinds of nickel oxide, copper oxide and alumina powders was further mixed and pulverized using a ball mill comprising alumina made balls and a container for 2 days.

After mixed, the powder was put in a quartz made boat and set in a tubular furnace. Then, the inside of the furnace was replaced with a mixed gas of hydrogen and argon at 1:1 by flowing at 1000 ml/min and raised up to 200° C. at the step of 10° C./min and maintained for 10 min. Then, changing the mixing rate of gas gradually to 100% hydrogen gas finally a 1000 ml/min and raised to 700° C. at a speed of 5° C./min. In this temperature raising process, nickel oxide and copper oxide were all reduced or alloyed. A mean particle size of this alloy particle was 0.1 μm.

When the inside of the reaction furnace reached 700° C. ethylene gas was mixed in hydrogen gas at 70 ml/min and carbon nano-fibers were grown according to the thermal CVD under the hydrogen-ethylene mixed gas atmosphere.

After this thermal CVD process was completed, the sample cooled in the furnace was taken out and change in weight was measured and it was found that carbon nano-fibers about 10 times of a Ni—Cu catalyst at the weight ratio were grown.

When the above carbon nano-fiber was observed with an electron microscope, it was found that Herringbone carbon nano-fibers with the C-surface arranged at nearly 45° C. in the longitudinal direction of fibers were grown. Further, it was also found that more than 80% of the range of diameters 200~500 nm was occupied by his carbon nano-fibers.

Further, when this carbon nano-fiber was analyzed with the TCD method, it was found that hydrogen element of 0.7 atomic % was contained. When the elementary analysis of its ash content was made, alumina was detected. In addition, the specific are space area of the generated carbon nano-fiber was 350 m$^2$.

Then, the carbon nano-fibers were immersed in chloroplatinic solution. The density of chloroplatinic acid was converted so that Pt became 15 wt % against carbon nano-fiber. Then, after boiling for one hour, sodium hydrogen carbonate solution was dripped for about 2 hours. After dripping, the solution was flown backward for 2 hours. Further, sodium hydrogen carbonate solution was dripped until the solution became pH9. Thereafter, the sample was moved in pure water, further boiled and cleaned.

The cleaned and filtered sediment were dried for 10 hours at 100° C. Thereafter, the sediment was put in an atmospheric furnace, reduced for 3 hours at 200° C. under the atmosphere with 100% hydrogen flown at 200 ml/min and catalyst carrier carbon nano-fiber was obtained.

By dispersing the reduced fiber in 100 mg pure water, a carbon nano-fiber layer was deposited on Toray made carbon paper TGP-H-060 of 10 cm$^2$ using the sucking and filtering method.

Then, the carbon paper with the carbon nano-fiber layer formed was dipped in 2% Nafion solution to impregnate Nafion. After impregnation, the sample was pulled out from the solution and dried in the air. When the weight was measured after the impregnation, the weight was increased by 30 mg.

Thus, an electrode layer comprising carbon nano-fibers impregnated with perfluorosulfonic acid polymer (Brand Name: Nafion) and Pt micro-particles dispersed high thickly on the surface could be formed on a collection plate made of carbon paper.

On the other hand, using anode electrodes manufactured by coating a slurry comprising AKZO NOBEL made Ketjenblack CE as a catalyst carrier carrying 30 wt % Pt—Ru catalyst, 20% perfluorosulfonic acid polymer membrane (Brand Name: Nafion) solution, and 2-ethoxy-ethanol on Toray made carbon paper TGP-H-030, a perfluorosulfonic acid polymer membrane (Brand Name: Nafion 117) was put between them and a membrane electrode assembly (MEA) was manufactured at 100° C. and the pressure of 100 kg/cm².

Using this MEA, a fuel cell was evaluated under the conditions of a temperature 70° C., methanol fuel density 2 mol/l, fuel supply speed 1 ml/min, and cathode air volume 200 ml/min. As a result, the output of 80 mW/cm² was obtained.

When the sample reduced in the above process was observed with the TEM, average $2 \times 10^{16}/m^2$ of Pt microparticles in mean particle size 1~3 nm were adhered on the carbon nano-fiber wall.

Further, when the element analysis was made at the same time using a TEM-EDX, it was found that Ni, Cu and Pt were carried on the fibers as micro-alloyed particles and the state of alumina particles were observed as being present among the fibers. Further, when the X-ray diffraction analysis of this sample was made, platinum crystals were recognized but Ni and Cu peaks were not recognized.

Parts of the cathode electrode layer of this fuel cell were cut off and containing contents were analyzed through the chemical analysis according to the ICP emission spectrography Z (Seiko Electron Industry made, SPS1200AR) and the infrared absorption method (LECO made CS444LS). Cu—Ni component was contained in carbon nano-fibers at a rate more than 0.2 wt % and less than 20 wt %. Further, Al component could be detected from the cathode electrode layer.

Further, this electrode layer was cut to thin pieces and observed with a transmission electron microscope. As a result, the lateral and horizontal sections of the carbon nano-fiber and presence of proton conductor could be observed. As shown in the above FIG. 2, the carbon nano-fiber 11, the platinum catalyst 12 and the Nafion layer 13 were satisfactorily joined without causing separation on the interface. Further, observed at a higher magnification, the state that the platinum catalyst 12 was present in the carbon nano-fiber 11 and Nafion entered into the carbon 11 could be observed.

In order to judge whether carrier catalyst and proton conductor entered in the fibers, the lateral sections of 20 fibers were observed at a magnification of 800000 times and by counting the number of fibers into which the carrier catalysts and proton conductors entered to obtain and a ratio. As a result, it was recognized that the fibers into which the carrier catalysts and proton conductors entered was more than 10% of the whole fibers. Further, the inside of the fibers referred to here denotes the areas of which depth from the fiber surface become more than 20% of the radius of the fibers.

Embodiment 9

Nickel oxide and copper oxide in mean primary particle size 40 nm were weighed so that the atomic ratio of reduced nickel and copper becomes 1:1. Further, by mixing alumina in mean particle size 30 nm to 4 vol % of a total volume of nickel oxide and copper oxide, raw material powder was prepared.

The mixed powder of raw materials thus obtained was further mixed and pulverized in an alumina made balls and a container using a planetary ball mill. Then, by granulating the powder, Ni—Cu alloyed particles in man particle size 90 μm were obtained as analysts for carbon fiber synthesizing.

The mixed powder was placed in a boat and put in a tubular furnace. The inside of the furnace was replaced with hydrogen and argon gas mixed at 1:1 by supplying at 1 L/min, the temperature was raised up to 200° C. and maintained for 10 min. Thereafter, while changing the gas mixing ratio gradually to 100% of hydrogen gas at 1 L/min and raised the temperature up to 500° C. As a result, nickel oxide and copper oxide were all reduced. After reduction, the powder was maintained at 500° C. for 30 min. and after fully alloyed, the temperature was further raised up to 700° C.

When the temperature was raised to 700° C., ethylene gas was mixed with hydrogen gas at 400 ml/min. and carbon nano-fibers were grown by the thermal CVD method. The grown carbon nano-fibers were cooled in the furnace and taken out and weight was measured. The weight was about 20 times against the raw material weight.

When the obtained carbon nano-fibers were observed by an electron microscope, the Herringbone structure carbon nano-fibers with the C-face arranged at about 450 in the longitudinal direction of the fiber were grown.

Then, the fibers were dispersed in water and passed through a mesh to sieve fibers sized below 80 nm. A mean size of thus obtained carbon nano-fibers was 230 nm and a variation σ in the distribution of fiber diameters was 110. In the carbon nano-fibers, fine powder of alumina was scattered.

When the specific surface area of this fiber was measured according to the BET method, it was 240 m²/g.

These fibers were dispersed in boiled water and chloroplatinic acid was added while heating the water.

Chloroplatinic acid was added by converting platinum becomes 15 wt % against fibers. 30 min. after boiled again, sodium hydrogen carbonate solution was dripped for one hour until the solution becomes pH9. After dripped, the solution was flown back, sucking and filtration were made, and adding pure water to sediment, boiled and cleaned the sediment.

The cleaned and filtered sediment was dried at 100° C. in a dryer for 10 hours. Then, put it in an atmospheric furnace and reduced for 10 hours at 200° C. in the atmosphere wherein 3% hydrogen-97% nitrogen gas was flown at 200 ml/min.

After the reduced, the sample was observed by an electron microscope and it was found that platinum micro particles in mean particle sizes 1~3 nm were carried on the wall of carbon nano-fibers.

When the X-ray diffraction analysis of this sample was conducted, quartz of platinum was recognized but nickel and copper were not recognized. Further, as a result of the elementary analysis by the EDX, platinum, nickel, copper and carbon were recognized as main components and also, very small amount of aluminum was recognized through the ICP analysis.

With 100 mg carbon nano-fibers carrying platinum dispersed in pure water, alcohol soluble organic materials were deposited on a porous plate coated with Teflon on the surface using the suction filtration method. This Teflon porous plate is a support medium to deposit a carbon nano-fiber layer. The deposit carbon nano-fiber layer was dried and after dipped in ethanol solution, the pressure was reduced. When the catalyst layer was separated from the porous medium, the pressure was returned to the atmospheric pressure, catalytic layer was scooped with a Teflon film and dried. In succession, the sample was dipped in 1% Nafion solution for vacuum impregnation. Thereafter, the sample was taken out from the Nafion solution and dried in a drier at 100° C. After the impregnation, the weight was increased by 25 mg.

Using the thus obtained electrode as a cathode electrode, an MEA was manufactured. An anode electrode was manufactured in the technique shown below. First, a slurry was prepared by mixing carbon black as a carrier with a catalyst carrying 30 wt % of Pt—Ru and Nafion. By coating this slurry on a carbon paper (Toray made), an anode electrode was obtained. The Nafion 117 as an electrolyte was put between the thus obtained anode electrode and the above-mentioned cathode electrode and using a carbon cloth of porosity more than 95% as the cathode electrode side collector, and by pressing them at a pressure 100 kg/cm$^2$ at 120°, an MEA was manufactured.

Using this MEA, the performance of the fuel cell was evaluated.

Embodiment 10

Carbon nano-fibers were manufactured and classified according to the similar method as in the Embodiment 9 except the synthesizing temperature was changed to 650° C. A mean fiber diameter $\mu$ of the obtained fibers was 150 nm and variance in the fiber diameter distribution $\sigma$ was 50.

Catalyst carry carbon nano-fibers were manufactured by carrying Pt—Ru as a carry catalyst on the thus obtained fibers. When carrying Pt—Ru on the fibers, chloroplatinic acid ruthenium chloride weighed and added so that platinum and ruthenium became a ratio 1:1 and 30 wt % to the carbon nano-fibers. Further, sodium hydrogen carbonate was added to the solution up to pH8.

The manufactured fibers were reduced in the conditions similar to those in the Embodiment 9 and after deposited on a carbon paper, Nafion was vacuum impregnated. When impregnated, the catalytic layer is separated from a carbon paper under the reduced pressure and therefore, it was put in a drier and dried by scooping with a Teflon sheet likewise the Embodiment 9. Repeating this process similarly in the Embodiment 9, the same amount of Nafion was impregnated. An MEA was manufactured in the similar condition as in the Embodiment 9 by laminating components in order of an anode collector (similar to the cathode side collector)/a fiber anode/an electrolyte membrane/a cathode electrode/a cathode collector (a carbon paper).

The cathode electrode here was manufactured by carrying 15 wt % platinum on a carbon black and after making slurry by mixing with Nafion, coating the slurry on a carbon paper and drying. The mixing ratio of carbon:platinum:Nafion (solid content) was adjusted to the same ratio for the fiber cathode in the Embodiment 9.

Using this MEA, the performance of fuel cell was evaluated.

Embodiment 11

A self-support cathode electrode made of carbon nano-fibers manufactured according to the same technique as in the Embodiment 9 and a self-support anode electrode made of carbon nano-fibers manufactured according to the same technique as in the Embodiment 10 were manufactured. An electrolyte membrane was put between these anode and cathode electrodes and a flexible carbon cloth was put over the cathode side and by hot pressing them, a flexible MEA was obtained.

The obtained MEA was fastened round the cylindrical hydrophilic porous plastic side having a hole at the center with the anode side inside. This was fixed to make a cylindrical cell and the performance of this fuel cell was evaluated. Further, the hole provided at the center of the porous plastic is for introducing fuel.

Embodiment 12

A self-support cathode electrode made of carbon nano-fibers manufactured according to the same technique as in the Embodiment 9 and a self-support anode electrode made of carbon nano-fibers manufactured according to the same technique as in the Embodiment 10 were manufactured. An electrolyte membrane was put between these anode and cathode electrodes and a flexible carbon cloth was put over the cathode side and by hot pressing them, a flexible MEA was obtained.

The obtained MEA was fastened round the cylindrical hydrophilic porous plastic side having a hole at the center with the anode side inside. This was fixed to make a cylindrical cell and the performance of this fuel cell was evaluated. Further, the hole provided at the center of the porous plastic is for introducing oxidizing reagent gas.

Embodiment 13

Commercially available carbon nano-fibers ($\mu$=80 nm, $\sigma$=500) were classified and adjusted to a mean fiber diameter $\mu$=100 nm, variation $\sigma$=500. Then, when a self-support cathode electrode was manufactured according to the similar technique as that in the Embodiment 9, a self-support membrane could be obtained Further, according to the same technique as that in the Embodiment 9, a carbon black anode electrode was manufactured. A 80 $\mu$m thick carbon cloth was put on the self-support membrane cathode manufactured as described above to a collector and an MEA was manufactured in the same conditions as those in the Embodiment 9.

Comparative Example 8

An anode electrode similar to that in the Embodiment 9 was prepared. For a cathode electrode, using a commercially available carbon fiber as a carrier and platinum catalysts were carried on commercially available fibers (a mean fiber diameter 50 nm, a mean fiber length 1 $\mu$m, $\sigma$=100) in the same method as in the Embodiment 9. Further, using the thus obtained catalyst carry carbon fibers, it was tried to form a catalyst layer in the similar method as in the Embodiment 9. However, when filtered and dried on a carbon paper, a crack was caused a self-support catalyst layer could not be formed.

Comparative Example 10

Using the similar carbon nano-fibers as in the Embodiment 9, an unself-support electrode was manufactured. Platinum carry carbon nano-fibers were dispersed in water, filtered on a carbon paper and an electrode was formed. Then, it was dipped in 1% Nafion solution and dried in nitrogen at 100° C. Further, by repeating the vacuum impregnation in the 1% Nafion solution two times and a cathode electrode layer was obtained. Then, an EMA was manufactured by executing the subsequent process similarly in the Embodiment 9.

Comparative Example 11

When an electrode was manufactured in the similar technique in the Embodiment 9 using a commercially available carbon nano-fibers ($\mu$=1500 nm, $\sigma$=200), a self-support membrane could be manufactured. An EMA was manufactured according to the similar technique in the Embodiment 9 using the 1% Nafion solution.

The fuel cell tests were conducted for the MEA in the Embodiments 9, 13 and Comparative Example 8 at constant conditions of methanol density 2 mol/L and fuel supply speed 5 ml/min, constant and by changing cathode air volume to 50 ml/min, 300 ml/min and 1000 ml/min and at the test temperature 70° C. The results of the tests are shown in the following Table 1.

TABLE 4

| | Cathode Air Flow Rate | | |
|---|---|---|---|
| | 50 ml/min | 300 ml/min | 1000 ml/min |
| Embodiment 9 | 70 mW/cm2 | 75 mW/cm2 | 73 mW/cm2 |
| Embodiment 13 | 75 mW/cm2 | 77 mW/cm2 | 68 mW/cm2 |
| Comparative Example 8 | 15 mW/cm2 | 25 mW/cm2 | 40 mW/cm2 |
| Comparative Example 9 | 40 mW/cm2 | 70 mW/cm2 | 65 mW/cm2 |
| Comparative Example 11 | 28 mW/cm2 | 15 mW/cm2 | 5 mW/cm2 |

For the MEA in the Embodiment 10 and the Comparative Example 8, the fuel cell test was conducted at constant conditions of methanol density 2 mol/L and cathode air volume 3000 ml/min. and fuel supply speeds changed at 1 ml/min., 5 ml/min. and 10 ml/min, and a test temperature 70° C. The results are shown in the following Table 5.

TABLE 5

| | Anode Fuel flow Rate | | |
|---|---|---|---|
| | 5 ml/min. | 1 ml/mi. | 5 ml/min. |
| Embodiment 10 | 72 mW/cm$^2$ | 55 mW/cm$^2$ | 80 mW/cm$^2$ |
| Comparative Example 8 | 48 mW/cm$^2$ | 45 mW/cm$^2$ | 49 mW/cm$^2$ |

Further, regarding the MEA in the Embodiment 11, the test was tested at a room temperature, methanol density 5 mol/L, fuel was supplied one time to the center of the cylinder, cathode side air was taken naturally from the atmospheric air without using an auxiliary equipment. Regarding the MEA in the Embodiment 13, the test was conduced at a room temperature methanol density 2 mol/L and the cathode side air was supplied into the center of cylinder using a pump at 500 ml/min.

As shown in the above Table 4, in the MEA (Embodiments 9 and 13) including a cathode electrode using carbon nano-fibers, the output was high although the cathode air flow rate was less when compared with the MEA having a cathode electrode using particle state carbons as carrier that were used in the Comparative Example 8.

In the case of the Embodiment 12, the output was sharply drops under the less air flow rate when compared with the self-support membrane in the Embodiment 9 as the air was hardly introduced to a carbon paper.

Regarding the Embodiment 13, the improvement of the performance was recognized especially at a portion with less air flow rate when compared with the Embodiment 9. However, if the air flow rate was increased excessively, water present in the electrodes was evaporated and therefore, resistance increased and the output dropped.

The condition shown in Table 5 is the condition that is not limiting the cathode air supply speed as the cathode side air flow rate was increased up to 3000 ml/min. When carbon nano-fibers were used as anode electrode as in the Embodiment 10, the output is improved with the increase of fuel flow rate. However, in the case of Comparative Example 8, the output was not so affected. This is considered because fuel was actually not supplied to the catalyst layer or fuel was not infiltrated into the catalyst layer even when the fuel supply rate to the anode was increased and the reaction sites decreased.

Further, in the case of the MEA in the Embodiment 11, the maximum output was 20 mW/cm$^2$.

In any case, it was confirmed that the sufficient output can be obtained in the MEA including electrodes made of carbon nano-fibers.

As described above in detail, according to the Embodiments 9~13, a self-support fuel cell catalyst sheet which has a highly gas diffusion capacity, a high catalyst using efficiency and a high output is provided. Further, according to this invention, a manufacturing method of self-support electrode layer for fuel cell which has a highly gas diffusion capacity, a high catalyst using efficiency and a high output is provided.

By using this invention, it is possible to obtain fuel cell electrodes excellent in fuel diffusion, high catalyst using efficiency and high output without depending on collectors so far could not realized, and its industrial value is immeasurable.

Embodiment 14

(Manufacturing of Conductive Fibers)

Mixed powders comprising nickel oxide powder (primary particle mean size is 80 nm) and copper oxide powder (primary particle mean size is 80 nm) as catalyst raw materials for generating carbon nano-fibers and alumina powder made of primary particles in a mean particle size 30 nm for suppressing particle growth of generating catalysts were prepared.

Further, the mixing ratio of nickel oxide powder and copper oxide powder was made at 1:1 for mixing nickel element and copper element, and a ratio of alumina to a total volume of nickel oxide powder and copper oxide power was made at 4 vol %.

These mixed powders are further mixed and pulverized to uniformly disperse various kinds of particles for 2 days using a planetary ball mill, alumina made balls and a container.

Uniformly dispersed mixed powders are put in a quartz boat and put in a tubular furnace. First, the inside of the tubular furnace was replaced by flowing hydrogen and argon gas mixed at 1:1 at 1 L/min, and raising the temperature up to 200° C. and maintained for 10 min. Then, by gradually changing the gas mixing ratio to 100% hydrogen at 1 L/min and raising the furnace temperature up to 500° C. and nickel oxide and copper oxide were all reduced. The furnace temperature was maintained at 500° C. for 30 min. and nickel oxide and copper oxide were thoroughly alloyed and thus, catalyst particles comprising Cu—Ni in a mean particle size 200 nm for carbon nano-fiber generating were manufactured.

In succession, carbon nano-fibers (conductive fibers) were produced from the generating catalysts as shown below.

After raising the temperature in the furnace containing the generating catalyst particles from 500° C. to 700° C., ethylene gas as raw material gas was introduced into the furnace filled with hydrogen gas at a flow rate 200 ml/min, an carbon was separated using Cu—Ni alloy particles as a catalyst and carbon nano-fibers that are conductive fibers were generated.

After cooled in the furnace, carbon nano-fibers were taken out and the weight was measured. The weight was about 10 times against raw material powders.

When the thus obtained carbon nano-fibers were observed with an electron microscope, it was confirmed that carbon nano-fibers in a so-called Herringbone structure with the C-faces angled by about 45° in the longitudinal direction of fibers were laminated in the longitudinal direction of the fibers were obtained.

Further, the obtained carbon nano-fibers were manufactured in two kinds of fibers in different particle sizes; one in the shape having a peak of minor axis distribution at the minor axis 500 nm and a peak of major axis distribution at the major axis 50 μm (the minor axis 400~600 nm, the major axis 20~70 μm) and the other in the shape having a peak of minor axis distribution at the minor axis 50 nm and a peak of the major axis distribution at the major axis 5 μm (the minor axis 40~70 nm, the major axis 1~10 μm).

Further, micro alumina powders were distributed in the carbon nano-fibers.

In addition, the processes up to the generation catalyst particle formation were conducted in the entirely same manner as a confirmation test, and the obtained Cu—Ni alloy was examined. As a result, it was detected that the obtained Cu—Ni alloy was Cu—Ni alloy particles comprising secondary particles in mean particle size 500 nm produced from primary particles in mean particle size 50 nm and from this finding, it is seen that carbon nano-fibers in minor axis corresponding to the secondary particle size and carbon nano-fibers in minor axis corresponding to the primary particle size were generated.

As described above, conductive fibers in two kinds of particle size distributions were obtained.

(Carry of Electrode Catalysts on Conductive Fibers)

Carbon nano-fibers in different particle size, which are conductive catalysts were dispersed in water and a dispersion solution was obtained.

The dispersion solution was brought to boil by heating and chloroplatinic acid that was catalyst raw material for electrodes was added. The chloroplatinic acid was added by converting so as to make the volume of platinum component to 15 wt % of a total volume of conductive fibers.

At 20 min. after adding chloroplatinic acid, sodium hydrogen carbonate dispersed solution was further dropped for one hour to make pH 10 to react chloroplatinic acid with sodium hydrogen carbonate to generate hydroxide of platinum and carry on the conductive fiber surfaces. Further, the solution was flown back for 2 hours to thoroughly react.

Then, conductive fibers to carry hydroxide of platinum obtained by sucking and filtering the dispersed solution was put in pure water and after cleaning the conductive fibers by boiling, the fibers were filtered again to remove impurities adhered on the surfaces.

The cleaned and filtered conductive particles were put in a drier kept at 100° C. and dried for 10 hours. The dried conductive particles were put in an atmospheric furnace and heated at 200° C. for 10 hours while flowing 3% hydrogen-97% nitrogen gas at 200 ml/min in the furnace. Thus, the hydroxide of platinum carried on the conductive particle surfaces were reduced to platinum.

After reduced, the sample was observed with an electron microscope, it was confirmed that micro-particles of platinum in mean particle sizes 1~3 nm were carried as electrode catalysts on the walls of carbon nano-fibers that are conductive fibers.

The X-ray diffraction analysis of this same was conduced and the presence of quartz of platinum was confirmed but nickel and copper were not recognized.

(Manufacture of Cathode Electrode)

By dispersing 100 mg of carbon nano-fibers carrying platinum in pure water, a dispersion solution was adjusted. This dispersion solution was coated on a porous carbon paper (Toray made: Brand Name: GPH090) and after conductive fibers were deposited by filtering through a carbon paper, the conductive fibers were dried.

An 1% solution of proton conductive material (fluorinated resin having sulfonic acid, Nafion, Du Pont made) was prepared. Then, the sample was vacuum dipped in this solution (the impregnation process) and then, the sample was taken out from the solution and dried at 100° C. in a drier. By repairing this process comprising the impregnation process and the drying process 3 times, proton conductive material was adhered on the surfaces of the proton conducive material. Further, a weight increase of 30 mg was confirmed before and after the adherence of the proton conducive material, it is considered that 30 mg of the proton conductive material were adhered.

Thus, an electrode with a catalyst layer comprising conductive fibers having two kinds of particle size distribution peaks carrying catalysts formed on the surface of the collector was manufactured.

The thickness of the catalyst layer in the obtained electrode was 300 μm.

Further, when the catalyst layer was checked with an electron microscope, there are lumps of conductive fibers in small particle sizes dispersed in the clearances of conductive fibers in large particle sizes, and pores existing in the catalyst layer are two types; pore size 40~60 nm formed by conductive fibers in small particle size and pore size 400~600 nm formed by conductive fibers in large particle size.

(Manufacture of Fuel Cell)

The electrodes manufactured as described above were used as the cathode electrodes.

Using carbon particles in mean particle size 100 nm (a mean aspect ratio 1:1) instead of conductive fibers, anode electrodes were manufactured in the same manner as cathode electrodes excepting the use of a mixture comprising a chloroplatinic acid and Ru at a ratio of platinum element and ruthenium element 1:1 instead of chloroplatinic acid as raw material of catalyst for electrodes. The anode catalyst layer thus obtained was a thick porous medium formed from carbon particles carrying Pt—Ru alloy, and its porosity was 20%, mean pore size was about 200 nm, and membrane thickness was 100 μm.

A proton conductive membrane (Nafion 117: DuPont made) was put between the cathode electrode and the anode electrode and pressed at a pressure 100 kg/cm$^2$ and at 120° C. Thus, a fuel cell was manufactured.

Figure 8:
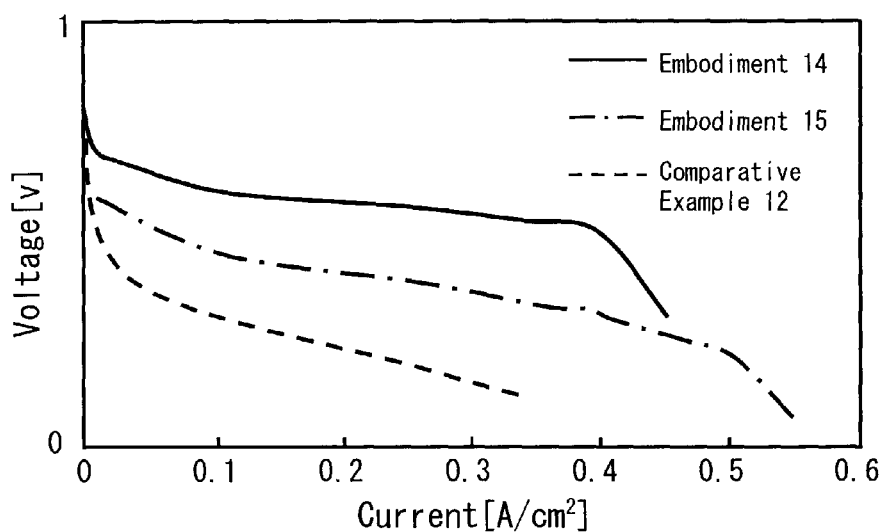
FIG. 8 is a characteristic evaluation diagram of the fuel cell obtained in the embodiments.

The relation between generated voltages and currents when liquid fuel comprising methanol and water was supplied to the anode electrode of the obtained fuel cell at 100 ml/min. and oxygen to the cathode electrode at 500 ml. The results are shown in FIG. 8.

Embodiment 15

(Formation of Sparse Catalyst Layer)

Excepting the use of a mixture comprising chloroplatinic acid and ruthenium chloride at a rate of platinum element and ruthenium element 1:1 instead of chloroplatinic that was raw material of electrode catalysts, the anode electrode was manufactured in the similar manufacturing method as the cathode electrode in the Embodiment 14. That is, a catalyst layer of which catalysts carried on the surfaces of conductive fibers in the Embodiment 14 were Pt—Ru alloy particle instead of platinum particles was formed on the collector surface, and this catalyst layer was made a sparse catalyst layer.

(Formation of Thick Catalyst Layer)

A catalyst layer (a thick catalyst layer) was formed on the surface of a carbon paper (a base substance for transfer) in the similar manner as in the manufacturing method of the anode electrode in the Embodiment 14 except that a mixture composed of chloroplatinic acid and ruthenium chloride was used instead of chloroplatinic acid that is catalyst raw material for electrode at a rate of platinum element and ruthenium element 1:1 and that carbon black in a mean particle size 70 nm was used for a carrier instead f carbon nano-fiber. The obtained catalyst layer was a thick porous medium made of carbon particles carrying Pr—Ru alloy and its porosity was 20%, a means pore size was about 200 nm and its membrane thickness was 50 μm.

Then, a proton conductive membrane surface same as that in the Embodiment 14 was prepared and the thick catalyst layer was transferred on the proton membrane from the carbon paper that is the base substance for transferring. The base substance for transfer was put over the proton conductive member through the thick catalyst layer and the thick catalyst layer was transferred by stripping off the carbon paper only.

When the thick catalyst layer transferred on the surface of the proton conductive membrane was observed through an electron microscope, it was a thick layer of a mean pore size about 200 nm and the membrane thickness was 50 μm.

(Manufacture of Cathode Electrode)

Conductive fibers were manufactured in the same manner as in the Embodiment 14 and the obtained conductive fibers were classified and conductive powders in minor axis 40~60 nm and major axis (carrier fiber) 1~5 μm were obtained.

Using this carry fibers only as conducive fibers, cathode electrodes were manufactured in the similar manner in the Embodiment 14 excepting that the volume of this carry fibers was made the same as the total volume of conductive fibers in the Embodiment 14. When the catalyst layers of the obtained cathode electrodes was observed, almost all pore sizes were 40~60 nm and the distribution of pore sizes was small.

(Manufacture of Fuel Cell)

After laminating a collector having a sparse catalyst layer formed, a proton conductive membrane having a thick catalyst layer, a cathode electrode (the collector and catalyst layers) in order of the collector/sparse catalyst layer/thick catalyst layer/proton conductive membrane/catalyst layer/collector, this laminated products were heat pressed likewise the Embodiment 1 and a fuel cell was manufactured.

The result of the characteristic evaluation of this fuel cell conducted are shown in FIG. 8.

Comparative Example 12

Using the anode electrode and the proton conductive membrane used in the Embodiment 14 and the cathode electrode used in the Embodiment 15 were heat pressed likewise the Embodiment 14 and a fuel cell was manufactured.

The results of the characteristic evaluation conducted on this fuel cell are shown in FIG. 8.

When the Embodiment 14 was compared with the Comparative Example 12, the using efficiency of the cathode catalyst layer in the Embodiment 14 was improved and the cell output was improved as a result of the improvement of gas diffusion because of the pore size distribution irrespective of decrease in the catalyst carry ratio corresponding to presence of large size conductive fibers.

The outputs of the fuel cells in the Embodiment 15 and the Comparative Example 12 are improved. Although decrease in fuel crossover was common to both fuel cells, in the fuel cell in the Embodiment 15, large pores were present in the anode catalyst layer ad the diffusion of liquid fuel was improved and as a result, the using efficiency of the anode catalyst was improved and resulted in the improvement the cell performance.

As described above in detail, according to this invention, it is possible to provide a manufacturing method of carbon-fiber synthesizing catalyst, composite carbon materials and carbon fibers and catalyst materials for fuel cell and a catalyst material for fuel cell manufacturing method capable of improving output characteristics of fuel cells.

Further, according to this invention, it is possible to provide fuel cell electrodes that have highly efficient catalysts, high fuel gas diffusion and are capable of producing high output stably. According to this invention, it is possible to provide self-support fuel cell catalyst sheets that have a high gas diffusion, a catalyst using efficiency and a high output. Further, according to this invention, it is possible to provide a manufacturing method of self-support electrode layer for fuel cell that have a high gas diffusion, a high catalyst using efficiency and a high output. In addition, according to this invention, it is possible to provide electrodes for fuel cell capable of achieving high output or fuel cell electrodes enabling the high output of fuel cell.

What is claimed is:

1. An electrode catalyst material comprising:
   carbon nano-fibers of which each contains an interior area whose depth from the surface of the fiber is 20% or more of the radius of the fiber; and
   catalyst particles and proton conductors carried on the surfaces and in the insides of the interior area of the carbon nano-fibers.

2. The electrode catalyst material as claimed in claim 1 wherein the carbon nano-fibers have a specific surface area according to a BET adsorption method of 200-500 $m^2/g$.

3. The electrode catalyst material as claimed in claim 1 wherein the catalyst particles comprise at least one metallic element selected from the group consisting of Ni, Fe, and Co.

4. The electrode catalyst material as claimed in claim 3 wherein the at least one metallic elements is present in an amount of 30 wt % or less in the catalyst particles.

5. The electrode catalyst material as claimed in claim 1 wherein the carbon nano-fibers have a mean diameter 100 to 1000 nm.

6. The electrode catalyst material as claimed in claim 1 wherein the catalyst particles have a mean diameter of 10 nm or less.

7. The electrode catalyst material as claimed in claim 1 wherein the catalyst particles are present in an amount of 10 to 50 wt % to the carbon nano-fibers.

8. The electrode catalyst material as claimed in claim 1 wherein:
   the carbon nano-fibers have a mean diameter of 100-1000 nm and the specific surface area according to a BET adsorption method of 200-500 $m^2/g$; and
   the catalyst particles comprise Cu, Pt or Ru, and at least one metallic element selected from the group consisting of Ni, Fe and Co.

9. The electrode catalyst material as claimed in claim 1, wherein 10% or more of the carbon nano-fibers have the catalyst particles and the proton conductors carried on the surfaces and in the insides of the interior area of the carbon nano-fibers.

10. The electrode catalyst material as claimed in claim 1 wherein the carbon nano-fibers comprise plural carbon crystal grains oriented in the longitudinal direction of the fiber.

11. A fuel cell comprising an anode electrode and a cathode electrode, and an electrolyte membrane arranged between the anode electrode and the cathode electrode, wherein at least one of the anode electrode and the cathode electrode employs the electrode catalyst material as claimed in claim 1.

12. A production method of the electrode catalyst material as claimed in claim 1, the method consisting of:
   a) a process to pulverize and mix irreducible inorganic material particles with a mean primary particle diameter of 500 nm or less consisting of aluminum oxide, magnesium oxide, or silicon oxide, and reducible inorganic material particles with a mean primary particle diameter of 500 nm or less consisting of at least one oxide selected from the group consisting of iron oxide, cobalt oxide, and nickel oxide, or alternatively consisting of at least one oxide selected from the group consisting of iron oxide, cobalt oxide, and nickel oxide, and copper oxide;
   b) a process to obtain a powder mixture of metallic particles with a mean particle diameter below 1 μm and the irreducible inorganic material particles as carbon fiber synthesizing catalysts by heat-treating the obtained mixture of a) in a furnace under a reduction atmosphere and reducing reducible inorganic material particles;
   c) a process to synthesize carbon nano-fibers by thermally decomposing hydrocarbon under the existence of the carbon fiber synthesizing catalysts; and
   d) a process to obtain the carbon nano-fibers carrying catalyst particles on the surfaces and in the insides by making the carbon nano-fibers carry the catalyst particles with a colloidal method.

13. The electrode catalyst material according to claim 1, wherein the carbon nano-fibers are in a polycrystalline structure assembled with crystalline particles.

14. The electrode catalyst material according to claim 13, wherein a nano-order concavo-convex surface exists on the surface of the carbon nano-fibers.

15. The electrode catalyst material according to claim 14, wherein the catalyst particles are on the polycrystalline particle surface and in the concavo-convex surface and boundary pores of the crystalline particles.

* * * * *